United States Patent [19]

Callaghan

[11] Patent Number: 4,521,646
[45] Date of Patent: Jun. 4, 1985

[54] METHODS AND APPARATUS FOR BANDWIDTH REDUCTION

[76] Inventor: Edward P. Callaghan, 2021 New Hyde Park Rd., New Hyde Park, N.Y. 11040

[21] Appl. No.: 326,472

[22] Filed: Dec. 2, 1981

Related U.S. Application Data

[63] Continuation of Ser. No. 163,270, Jun. 26, 1980, abandoned, which is a continuation-in-part of Ser. No. 34,845, Apr. 30, 1979, abandoned.

[51] Int. Cl.$^3$ ............................................... G10L 1/00
[52] U.S. Cl. ........................................ 375/122; 381/29
[58] Field of Search ................ 179/15.55 R, 15.55 T, 179/1.5 M, 1.5 G; 84/1.01, 1.28; 370/118; 332/16 R, 41; 358/133, 261

[56] References Cited

U.S. PATENT DOCUMENTS 2,939,918 6/1960 Freedman ..................... 179/15.55 R
3,914,554 10/1975 Seidel ........................... 179/15.55 R

OTHER PUBLICATIONS

Tsuruoka, "New Narrow Band Telephone . . . ", Jaeu, No. 2, (71), vol. 4, pp. 18–22.

Primary Examiner—Emanuel S. Kemeny
Attorney, Agent, or Firm—R. Gale Rhodes, Jr.

[57] ABSTRACT

Bandwidth reduction by simple spectrum folding (i.e., adding the reversed-spectrum signal to the original signal) causes spectrum ambiguties and cancellations which are avoided by encoding, i.e., first "earmarking" the original signal by adding to the original signal its squared signal, then angle-modulating the reversed-spectrum earmarked-signal before adding it to the earmarked signal. Bandwidth expansion for signal reconstruction involves decoders which use the encoder in a feedback loop.

30 Claims, 18 Drawing Figures

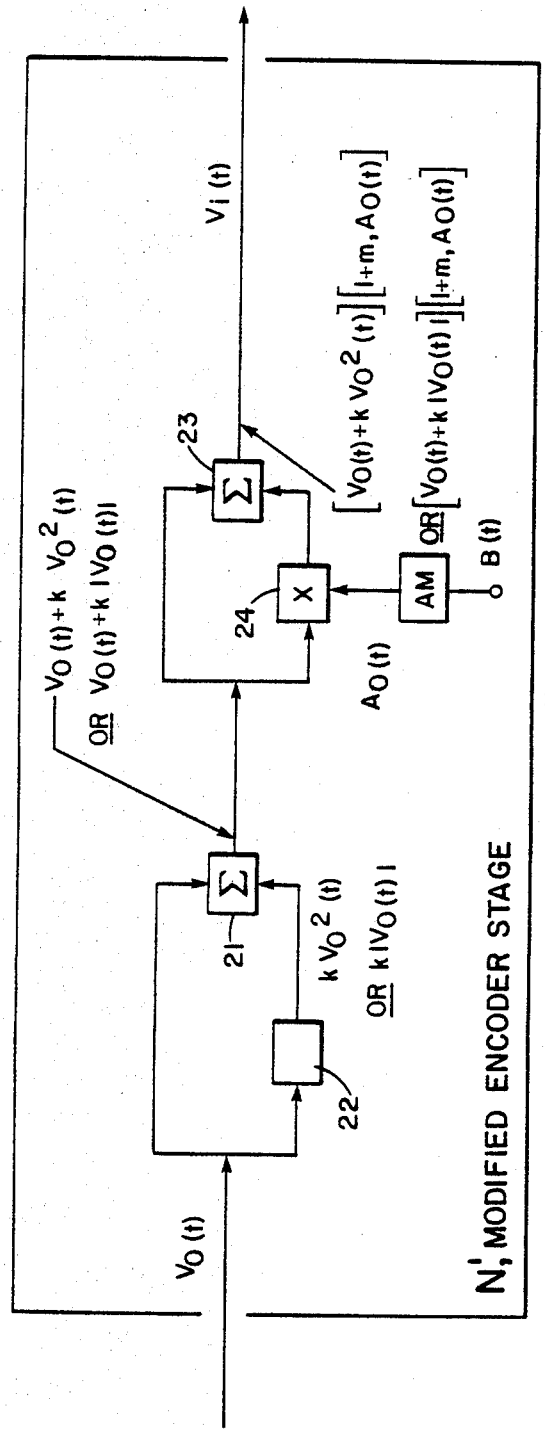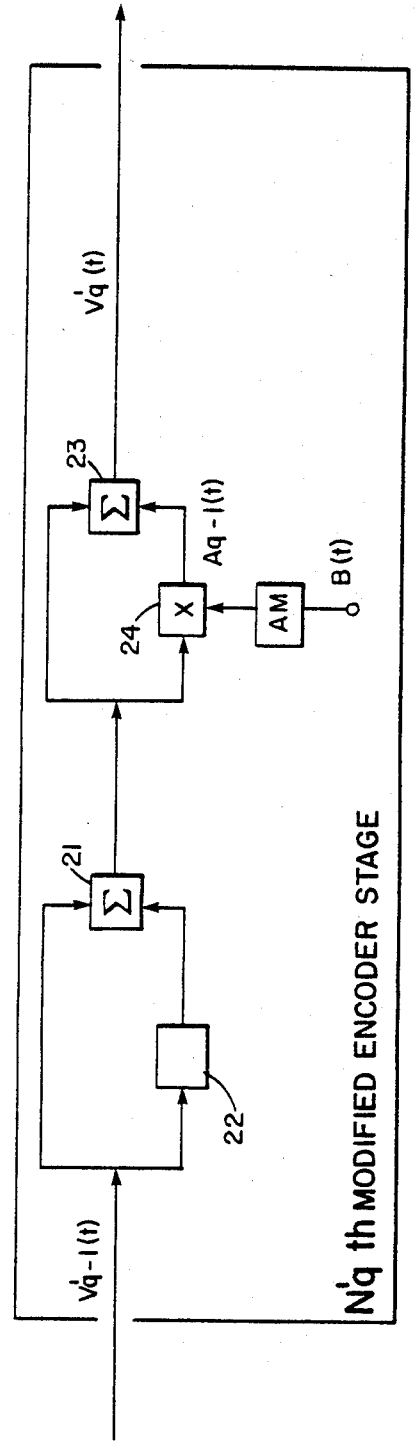
Fig. 15
Fig. 16

METHODS AND APPARATUS FOR BANDWIDTH REDUCTION

This application is a continuation of application Ser. No. 163,270 filed June 26, 1980, now abandoned, which is a continuation-in-part of application Ser. No. 034,845 filed Apr. 30, 1979, now abandoned.

TECHNICAL FIELD

Broadly speaking, this invention relates to bandwidth reduction. More particularly, in a preferred embodiment, this invention relates to methods and apparatus for reducing the bandwidth of an information-bearing signal without the loss of any significant information carried thereby.

BACKGROUND OF THE INVENTION

Bandwidth, that unavoidable but necessary range of frequencies that must be made available to transmit message signals has, in recent years, become the target of intense efforts by scientists and engineers working in the telecommunication field. These efforts are directed towards discovering techniques to reduce the bandwidth to the smallest range possible, without hindering the rate at which the message information can flow. In effect, what is being sought are signal processing methods that optimize the required bandwidth consistent with the information rate of the message that must flow through the channel.

Message signals, such as speech, music or television have inherent bandwidths that are greatly in excess of that which is theoretically necessary for the actual information transfer rate contained in these types of signals. The burdens associated with this excessive bandwidth are tolerated because no effective, practical signal processing methods have heretofore been discovered that can encode these signals, in real time, so as to permit the use of a smaller range of frequencies. This encoding must, of course, be coupled with a corresponding decoding process so that, after transmission, reconstruction of the encoded signal yields the original message signal. The lack of any really practical bandwidth reduction scheme means that there is a tremendous overcrowding of the radio spectrum. For example, television broadcasting must be aired on VHF and UHF and even microwave communication is rapidly becoming difficult due to a lack of clear channels. In fact, the communications industry has been forced to go to optical methods just to accommodate the vast need for bandwidth to meet today's needs for telecommunication services.

SUMMARY OF THE INVENTION

As a solution to these and other problems, the instant invention comprises a signal processing method that provides unlimited real-time bandwidth reduction of any bandwidth-limited message signal. The amount of bandwidth reduction is limited solely by practical considerations, particularly state-of-the-art circuit design. Illustrative apparatus for practicing the above method is also disclosed.

More specifically, in a preferred embodiment, this invention comprises a method of reducing the bandwidth of an intelligence-bearing signal. The method comprises the steps of earmarking the signal by adding thereto a non-linear signal obtained from the intelligence-bearing signal, multiplying the earmarked signal with an angle-modulated carrier having a radian carrier frequency numerically equal to the nominal bandwidth of the intelligence-bearing signal, thereby to effectively reverse the signal spectrum of the intelligence-bearing signal over a predetermined frequency range, summing the multiplied signal with the earmarked signal, and then filtering the summed signal in a low-pass filter.

The invention and its mode of operation will be more fully understood from the following detailed description when taken with the appended drawing in which:

BRIEF DESCRIPTION OF THE DRAWINGS

FIG. 15 is a block schematic diagram of an alternate embodiment of an encoder stage for use in the system of FIG. 1;

FIG. 16 is a block schematic diagram of an alternate embodiment of an intermediate encoder stage for use in the system of FIG. 1;

DETAILED DESCRIPTION OF THE INVENTION

Figure 1:
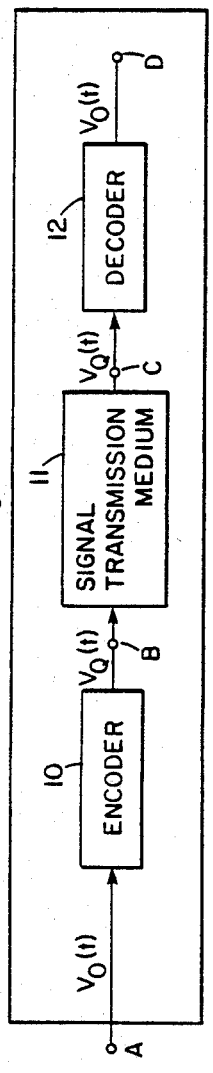
FIG. 1 is a block schematic drawing of an illustrative bandwidth reduction expansion system according to the invention.

Two illustrative signal processing methods will now be described each of which provides unlimited, real-time bandwidth reduction of a message signal with finite boundaries as well as the complete reconstruction of the reduced bandwidth signal to its original form. The first method utilizes a nonlinear derived signal and the second, a piecewise-linear derived signal. The nonlinear derived signal approach is thoroughly analyzed, since closed mathematical expressions are available; however, somewhat stringent circuit design requirements are necessary. The piecewise-linear approach overcomes these stringent requirements but there are no closed mathematical expressions for analysis. There are, however, convincing arguments to support the contention that the piecewise-linear approach may effectively replace the nonlinear approach. The appendixes serve as backup information to support the analyses given in the main description of the invention. A table is also given so as to unburden the description with lengthy mathematical equations and to make the detailed description more easily read.

According to the instant invention, real-time bandwidth reduction of message signals with finite bandwidths is accomplished by spectrum folding, which is readily obtained by the addition of a reversed message signal spectrum. The usual spectrum ambiguities and spectrum cancellations are avoided by "earmarking" the message signal spectrum before folding and also by the application of angle modulation to the reversed signal spectrum. Earmarking is accomplished by adding to the original message signal a nonlinear signal that is derived from the message signal.

The harmonics and cross-products, that result from the nonlinearity provide the means for establishing a unique relationship that permits the unequivocal reconstruction of the original message signal. The utilization of angle modulation (either frequency or phase) on the reversed signal spectrum has an effect similar to that of "passing by a picket fence" and effectively prevents the obscurity of either the reversed or unreversed portions of the message signal spectrum when folded upon itself.

The signal processing circuitry that accomplishes the bandwidth reduction is called the encoder, and comprises one or more encoder stages (the number of encoder stages used depends upon the amount of bandwidth reduction desired). Each encoder stage can reduce the bandwidth of a message signal up to a theoretical maximum of 50%, i.e. a 2:1 compression ratio. The ultimate bandwidth reduction desired will be determined by the nature of the message signal and its information rate. Since the encoder stages of the instant invention do not destroy any signal information, any number of encoder stages may be used until the desired bandwidth compression ratio is obtained.

The signal processing circuitry that accomplishes the reconstruction of the reduced bandwidth signal, resulting in the regeneration of the original message signal, is called the decoder. The decoder comprises a number of decoder stages equal to the number of encoder stages. This equivalence is the result of a one-to-one correspondence in circuit parameter design for each encoder/decoder stage.

Figure 2:
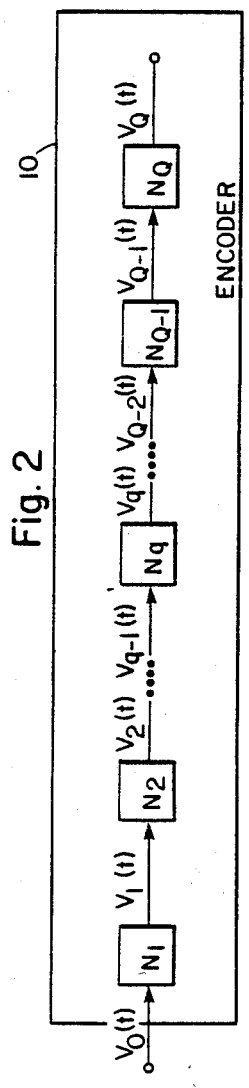
FIG. 2 is a block schematic drawing of an illustrative Q-stage encoder for use in the system of FIG. 1.

FIG. 1 is a schematic diagram of an illustrative signal bandwidth reduction and signal reconstruction circuit according to the invention. As shown, an encoder 10 is connected to the input of some suitable signal transmission medium 11 thence to a decoder 12. The original message signal at the input to encoder 10 is designated $V_o(t)$ and represents an electrical time-varying voltage of a finite bandwidth signal, such as, voice, video, baseband carrier, etc. As shown in FIG. 2, encoder 10 comprises Q stages; the signal output from the $N_q^{th}$ encoder stage being represented by $V_q(t)$. The signal output of the final encoder stage, $N_Q$, is designated $V_Q(t)$ and is in the form desired with a reduced bandwidth consistent with the capacity of signal transmission medium 11.

Typical signal transmission media would be wire, coaxial cable, radio, waveguide, optical fibers, etc. One skilled in the art will appreciate that a signal storage medium could be substituted for signal transmission medium 11 with equal success. Typical signal storage media would be phonograph records, wire or tape recorders, video tapes, computer memories, etc.

It will be evident that the signal bandwidth of the output signal from each succeeding encoder stage is less than the signal bandwidth of the output signal from the previous encoder stage; that is, the bandwidth of $V_q(t)$ is less than the bandwidth of $V_{q-1}(t)$.

Figure 3:
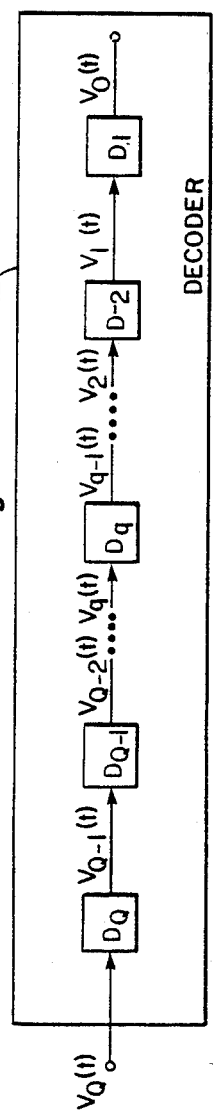
FIG. 3 is a block schematic drawing of an illustrative Q-stage decoder for use in the system of FIG. 1.

The reduced bandwidth signal from transmission medium 11, $V_Q(t)$, is the signal input into decoder 12 which, as shown in FIG. 3, similarly comprises Q decoder stages. Each decoder stage functions in an inverse manner to the corresponding encoder stage. The signal output from the $q^{th}$ decoder stage, $D_q$, is a reconstructed duplicate of the signal input to the $q^{th}$ encoder stage, $N_q$. Again, it will be evident that the output signal bandwidth of each succeeding decoder stage is greater than the output signal bandwidth of the previous decoder stage. The output of the final decoder stage, $D_1$, is the completely reconstructed original message signal, $V_o(t)$.

Figure 4:
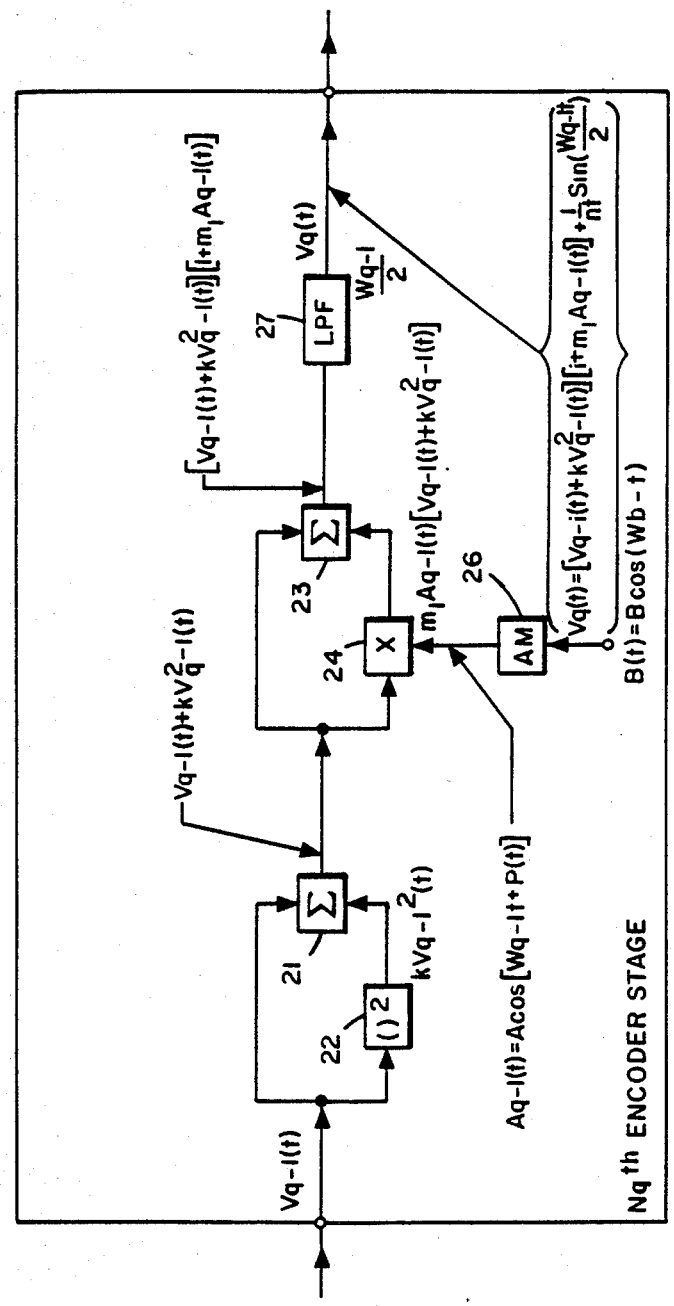
FIG. 4 is a block schematic drawing depicting a single encoder stage in greater detail.

FIG. 4 is a schematic diagram of the $N_q^{th}$ encoder state. As shown, the input signal is connected to one input of a first summing circuit 21 which has as its other input the output of a two-quadrant, square-law device 22. The output of summing circuit 21 forms one input of a second summing circuit 23. The other input to summing circuit 23 comprises the output of a multiplier 24 having as one input the output of first summing circuit 21 and as the other input the output of an angle modulator 26. The output of summing circuit 23 is connected to a low-pass filter 27. The input signal to the encoder stage may be designated as $V_{q-1}(t)$. The mathematical form of this input signal is expressed as:

$$V_{q-1}(t) = \Sigma_1^N v_n \cos(w_n t + a_n),$$

which represents a sum of sinusoids. Each sinusoid, commonly called a tone, has an amplitude $v_n$, a radian frequency $w_n$ and an electrical phase, $a_n$. The sum of these sinusoids represents a multitone signal, where each tone can be defined as:

$$v_n(t) = v_n \cos(w_n t + a_n),$$

The highest numerical value of the radian frequency that is to be expected, in any multitone signal, determines the bandwidth for that signal; therefore, a nominal bandwidth value, $w_{q-1}$, is defined as a value which is not exceeded by any of the radian frequency values of the tones in the signal. Mathematically, this can be stated as:

$$w_n < w_{q-1}$$

At the input to the encoder stage, a nonlinear signal is derived from the input signal via two-quadrant, square-law device 22 and is then combined with the input signal in summing circuit 21. The resulting signal may be expressed as:

$$V_{q-1}(t) + kV_{q-1}^2(t),$$

where k is an arbitrary constant and includes the input-output signal level relationship of the square-law device (the selection of a value for "k" is discussed in Appendix A.). The output from summing circuit 21 is designated as the earmarked signal. This earmarked signal is then multiplied in multiplier 24 by an angle-modulated carrier, $A_{q-1}(t)$, from modulator 26 with a radian carrier frequency that is numerically equal to the nominal bandwidth of the input signal, that is:

$$A_{q-1}(t) = A \cos [W_{q-1}t + P(t)]$$

The resulting signal output from the multiplier may be mathematically expressed as:

$$[V_{q-1}(t) + kV_{q-1}^2(t)]m_1 A_{q-1}(t),$$

where $m_1$ is an arbitrary constant and includes the input-output signal level relationship of multiplier 24. This multiplication operation effectively reverses the input signal spectrum in the frequency range:

$$w \leq w_{q-1}$$

The angle modulation is indicated by the P(t term and is expressed in either of two forms depending upon the type of angle modulation used; namely, frequency or phase modulation. If the modulating signal is expressed as:

$$B(t) = B \cos (W_b t),$$

then, for phase modulation:

$$P(t) = p_1 B(t),$$

and, for frequency modulation:

$$P(t) = p_2 \int B(t) dt,$$

where $p_1$ and $p_2$ are constants of the phase and frequency modulators, respectively (the arbitrary constants $p_1$, $p_2$, $W_b$ and B, are design parameters, the values of which are discussed in Appendix B).

Assuming that frequency modulation is utilized in the illustrative encoder stage shown in FIG. 1, the angle modulated carrier may be expressed as:

$$A_{q-1}(t) = A \sum_{r=-w}^{w} J_r(p_2 B/W_b) \cos[W_{q-1}t + rW_b t]$$

where $J_r(X)$ is a Bessel function of the first kind. The angle-modulated signal comprises a carrier defined by the r=0 term, or the carrier, is of prime importance, since this term, when multiplied by the earmarked signal is what effectively reverses the signal spectrum. The r≠0 terms have a similar effect; however, their main function is to remove any obscurity of the signal spectrums as a result of the spectrum folding.

The output signal from multiplier 24 is combined in summing circuit 23 with the earmarked signal and is then filtered. Filter 27 is a low-pass type with a cutoff frequency approximately defined within the range:

$$W_{q-1}/2 \leq w < W_{q-1}.$$

The exact value of the cutoff frequency depends upon the bandwidth reduction desired for the encoder stage with a maximum value of 50%. Since a mathematical expression for practical filter behavior is very complex, the mathematical form for the ideal low-pass filter will be used for the circuit descriptions and analyses that follow; however, practical filter considerations are discussed in Appendix C.

Using the mathematical notation explained in Table I, and assuming that the theoretically maximum bandwidth reduction per encoder stage is desired, then the output signal from low-pass filter 27 may be expressed as:

$$V_q(t) = [V_{q-1}(t) + kV_{q-1}^2(t)][1 + m_1 A_{q-1}(t)]*(1/\pi t)$$
$$\sin (W_{q-1}t/2),$$

where $V_q(t)$ is defined as the reduced bandwidth signal at the output of the $N_q^{th}$ encoder stage. The above expression indicates that the signal, $V_q(t)$, has a bandwidth which is only half of the nominal bandwidth of the input signal, $V_{q-1}(t)$.

Appendix B provides a detailed analysis of the reduced bandwidth output signal and mathematically provides that $V_q(t)$ is uniquely related to the input signal, $V_{q-1}(t)$. What is proven can be expressed as:

$$V_q(t) = V_q[V_{q-1}(t)],$$

or inversely:

$$V_q^{-1}[V_q(t)] = V_{q-1}(t).$$

Figure 5:
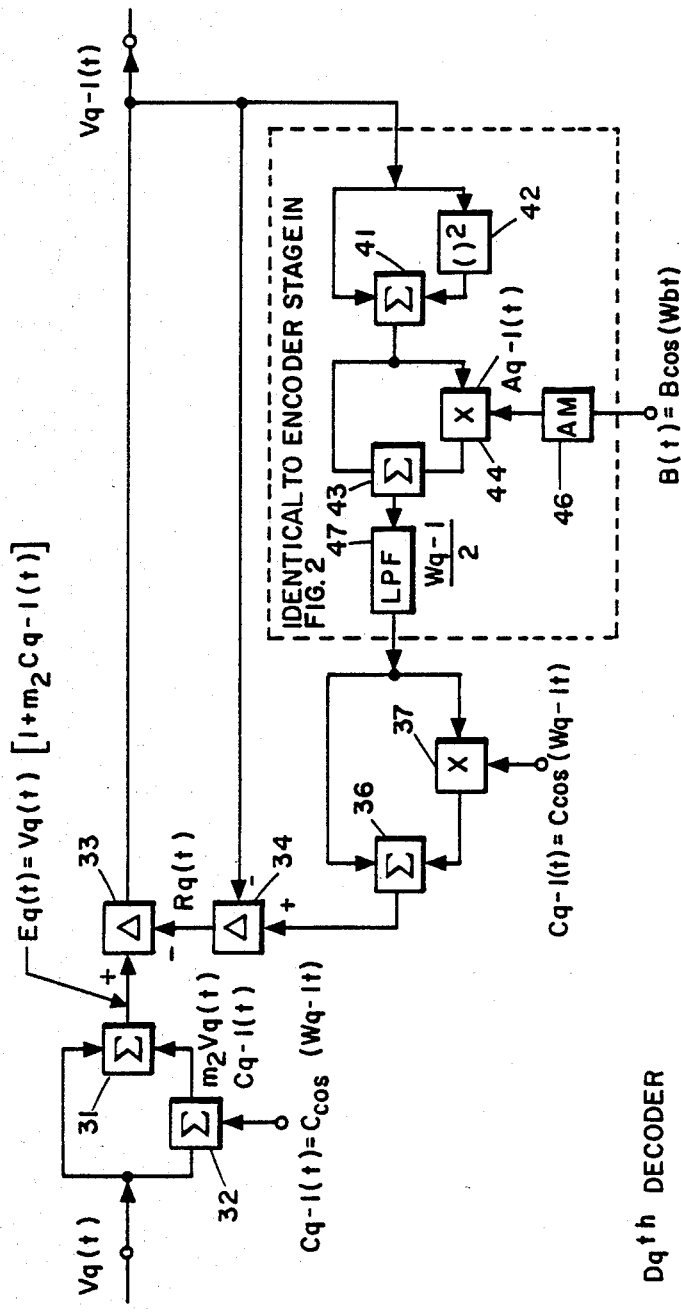
FIG. 5 is a block schematic drawing depicting a single decoder stage in greater detail.

FIG. 5 is a schematic diagram of the $D_q^{th}$ decoder stage. As shown, the input signal $V_q(t)$ is applied to one input of a first summing circuit 31, the other input of which receives the output of a multiplier circuit 32. The output of summing circuit 31 is connected to one input of a differencing circuit 33. The other input to differencing circuit 33 is connected to the output of a second differencing circuit 34 which receives on one input the output of differencing circuit 33 and on the other input the output of a second summing circuit 36. One input to summing circuit 36 comprises the output of a second multiplier 37 while the other input comprises the output of an encoder stage 38 substantially identical to the encoder stage described with reference to FIG. 4. More specifically, encoder 38 comprises a first summing circuit 41, a square-law device 42, a second summing circuit 43, a multiplier 44, an angle modulator 46, and a low-pass filter 47 all interconnected as previously described.

The input signal is a reduced bandwidth signal, designated $V_q(t)$, and has a nominal bandwidth of $W_q$; however, because of the one-to-one correspondence between the encoder and decoder stages, $V_q(t)$ will be processed by the $D_q^{th}$ decoder stage to reconstruct the signal $V_{q-1}(t)$ which has a nominal bandwidth of $W_{q-1}$. At the input to the decoder stage, the reduced bandwidth signal, $V_q(t)$, is multiplied in multiplier 32 by a carrier, $C_{q-1}(t)$, of constant amplitude C and a radian frequency numerically equal to the nominal bandwidth of the signal to be reconstructed, that is, $W_{q-1}$. The signal output from multiplier 32 is combined with the reduced bandwidth input signal in summing circuit 31 and the resulting signal is designated as the expanded bandwidth signal, $E_q(t)$, and may be expressed as:

$$E_q(t) = V_q(t) + m_2 V_q(t) C_{q-1}(t),$$

where $m_2$ is an arbitrary constant and includes the input-output signal level relationship of multiplier 32. No filtering is involved in the generation of $E_q(t)$ and consequently this signal is uniquely related to the reduced bandwidth input signal $V_q(t)$, that is:

$$E_q(t) = E_q[V_q(t)],$$

or inversely, $$E^{-1}[E_q(t)] = V_q(t).$$

In Appendix B, it will be shown that $V_q(t)$ is uniquely related to $V_{q-1}(t)$, that is:

$$V_q(t) = V_q[V_{q-1}(t)];$$

therefore, by transitive law, it can be concluded that:

$$E_q(t) = E_q[V_q(t)] = E_q[V_{q-1}(t)],$$

or inversely:

$$E_q^{-1}[E_q(t)] = V_{q-1}(t).$$

Not only is $E_q(t)$ uniquely related to $V_{q-1}(t)$, but it also contains $V_{q-1}(t)$ explicitly, that is:

$$E_q(t) = V_{q-1}(t) + R_q(t),$$

where $R_q(t)$ is designated as a remnant signal since it contains the extraneous parts of $E_q(t)$ so that only $V_{q-1}(t)$ remains. Appendix D provides the necessary mathematical analysis to demonstrate this explicitness and indicates that the explicit presence of $V_{q-1}(t)$ in $E_q(t)$ occurs when:

$$m_1 m_2 A C J_0(p_2 B/W_b) = 4.$$

The explicitness of $V_{q-1}(t)$, and also their uniqueness, is the means by which $V_{q-1}(t)$ can be reconstructed by the decoder stage. This is readily demonstrated by referring to FIG. 6 which is identical to the decoder stage shown in FIG. 5, except that it is simplified in detail so as to help demonstrate signal reconstruction. At Point B in FIG. 6, an unknown signal output from differencing circuit 33 is designated as $V(t)$. This signal is the direct result of the signals appearing at Point A and Point C. The signal appearing at Point A is the expanded bandwidth signal $E_q(t)$, which can be expressed as $E_q[V_{q-1}(t)]$ because of uniqueness. It follows that the signal appearing at Point E can also be expressed in unique notation, as $E_q[V(t)]$, since the circuitry involved from Point B to Point E is identical to the circuitry from Point F to Point A. The signal at Point D is the same as at Point B, that is, $V(t)$; therefore the signal at Point C is the direct result of the signals appearing at Point D and Point E and is the remnant signal, $R_q(t)$, mentioned above. Writing the circuit equation involves the differencing circuit output signal for Point B, there results:

$$V(t) = E_q[V_{q-1}(t)] - E_q[V(t)] + V(t),$$

which reduces to:

$$E_q[V(t)] = E_q[V_{q-1}(t)].$$

Consequently, because of uniqueness:

$$V(t) = V_{q-1}(t);$$

therefore, the output signal from the decoder stage is the reconstructed signal $V_{q-1}(t)$.

Figure 7:
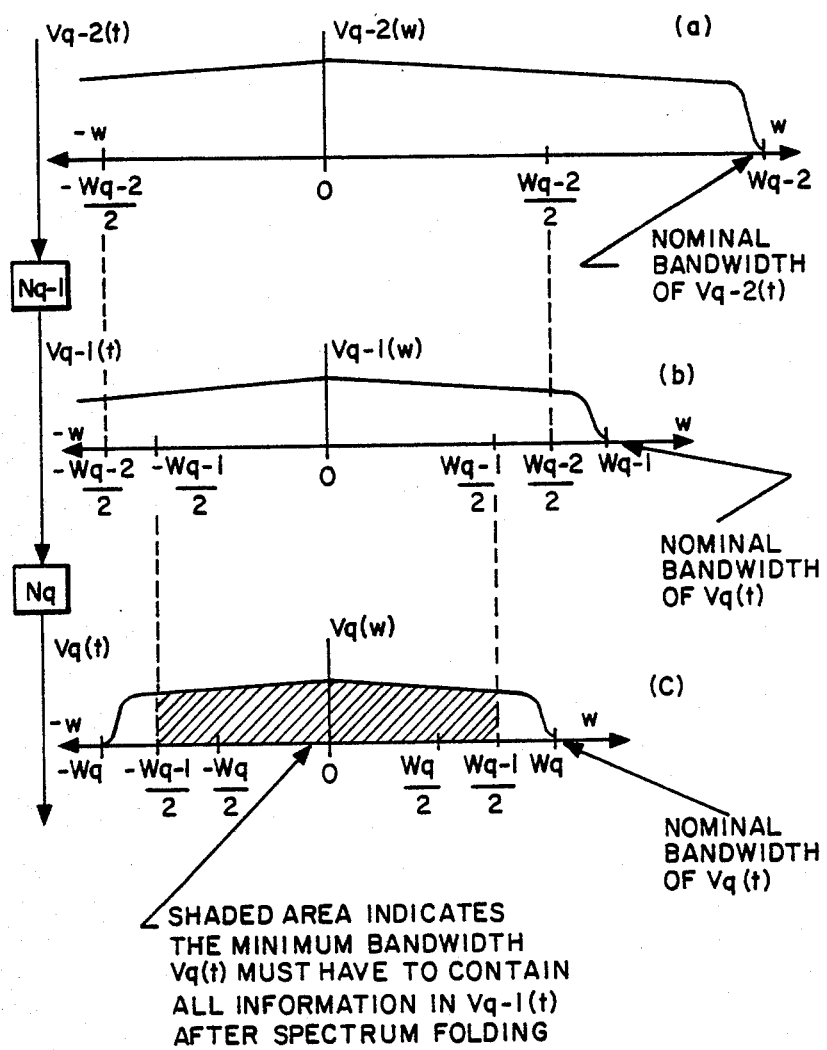
FIG. 7 is a graph depicting the signal spectrum at different points in the encoder shown in FIG. 4.

Theoretically, there is no limit to the amount of bandwidth reduction attainable with the instant invention. As a practical matter, a limit does exist due to problems in the design of the low-pass filters, the noise introduced by the active devices and the economics involved in the construction of encoders and decoders having a large number of stages. In the design of the encoder and decoder circuits, a practical consideration for the low-pass filters is the determination of the frequency at, and above which, the filter can be considered to have eliminated all the unwanted spectrum of the input signal to the filter. This frequency is designated as the nominal bandwidth of the input signal. Referring to FIG. 7, the nominal bandwidth of the input signal, $V_{q-1}(t)$, to the $q^{th}$ encoder, $N_q$, is selected to be a radian frequency $W_{q-1}$. This value of nominal bandwidth determines the value of the carrier frequencies for $A_{q-1}(t)$ and $C_{q-1}(t)$ used in the encoder and decoder circuit design. This bandwidth also establishes a spectrum folding line about which the spectrum of $V_{q-1}(t)$ is, in effect, folded by the addition of a reversed spectrum, as a result of the carrier $A_{q-1}(t)$; therefore, all signal information contained in $V_{q-1}(t)$, which has a nominal bandwidth $W_{q-1}$, will have all its signal information contained within a frequency range equal to $(\frac{1}{2})W_{q-1}$ after folding. This information has to be contained within the nominal bandwidth of the output signal, $V_q(t)$, of the $q^{th}$ decoder. Considering the practical cutoff characteristics of the low-pass filter used in the $q^{th}$ decoder, the nominal bandwidth of $V_q(t)$ is selected as $W_q$, such that $$(\tfrac{1}{2})W_{q-1} < W_q.$$

This is done to insure that all signal information contained in $V_{q-1}(t)$ is included in $V_q(t)$. The number of encoder and decoder stages required for a desired bandwidth reduction depends mainly upon the nominal bandwidth value selected for each input signal to an encoder stage.

If ideal low-pass filters are assumed to be used in the encoder/decoder circuits, then a theoretical minimum number of states can be determined from the nominal bandwidth values of the original message signal and the desired reduced bandwidth signal. Since the cutoff characteristic of an ideal low-pass filter has an infinite slope, as indicated in Table I(5), the difference between $W_q$ and $(\frac{1}{2})W_{q-1}$, in FIG. 7(c), approaches zero, that is $$W_q - (\tfrac{1}{2})W_{q-1} \to 0;$$

therefore, if the nominal bandwidth of the original message signal is $W_o$, and the nominal bandwidth of the desired reduced bandwidth signal is $W_Q$, then the minimum number of encoder/decoder stages, $Q_m$, required is:

$$2^{Q_m} W_o / W_Q.$$

In practice, however, the actual number of stages required will be greater than the theoretical minimum, that is:

$$Q > Q_m.$$

For any decoder stage, $D_q$, the input signal may be expressed as:

$$V_q(t) = [V_{q-1}(t) + kV_{q-1}^2(t)][1 + m_1A_{q-1}(t)]*(1/\pi t) \sin(W_{q-1}t/2).$$

This equation infers that there is no loss in signal level from the input to the encoder stage, $N_q$, through all the remaining encoder stages, the transmission medium and as many decoder stages, as there are encoder stages. It will now be assumed that this is not the case and that $V_q(t)$ is at a different level. This difference in level will be designated by multiplying $V_q(t)$ by a constant "u" which represents a value greater or less than one, that is, if the transmission condition provides a signal gain or loss, respectively. Since the signal folding operation and the low-pass filtering factors in the above expression, that is:

$$[1 + m_1A_{q-1}(t)]*(1/\pi t) \sin(W_{q-1}t/2),$$

do not affect the signal level of $V_{q-1}(t)$, there need only be concern for the factor:

$$[V_{q-1}(t) + kV_{q-1}^2(t)];$$

therefore, for signal level analysis, the input signal to decoder stage, $D_q$, can be expressed as:

$$uV_q(t) = u[V_{q-1}(t) + kV_{q-1}^2(t)].$$

Figure 6:
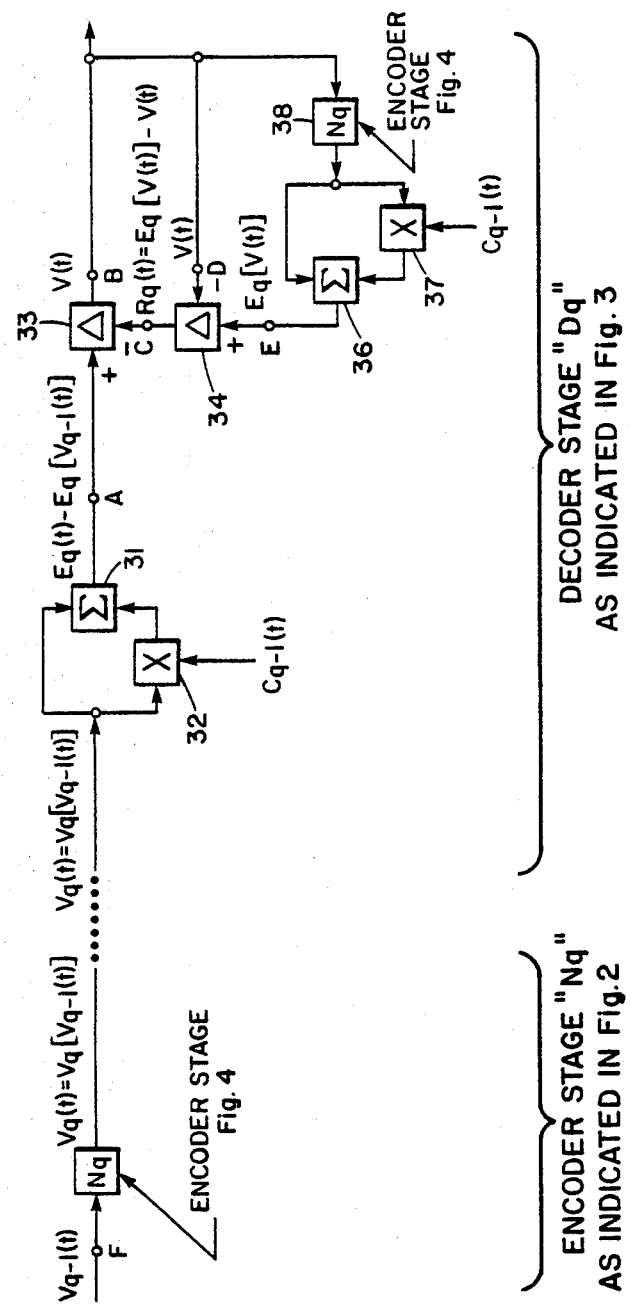
FIG. 6 is a simplified version of the schematic shown in FIG. 5.
Figure 8:
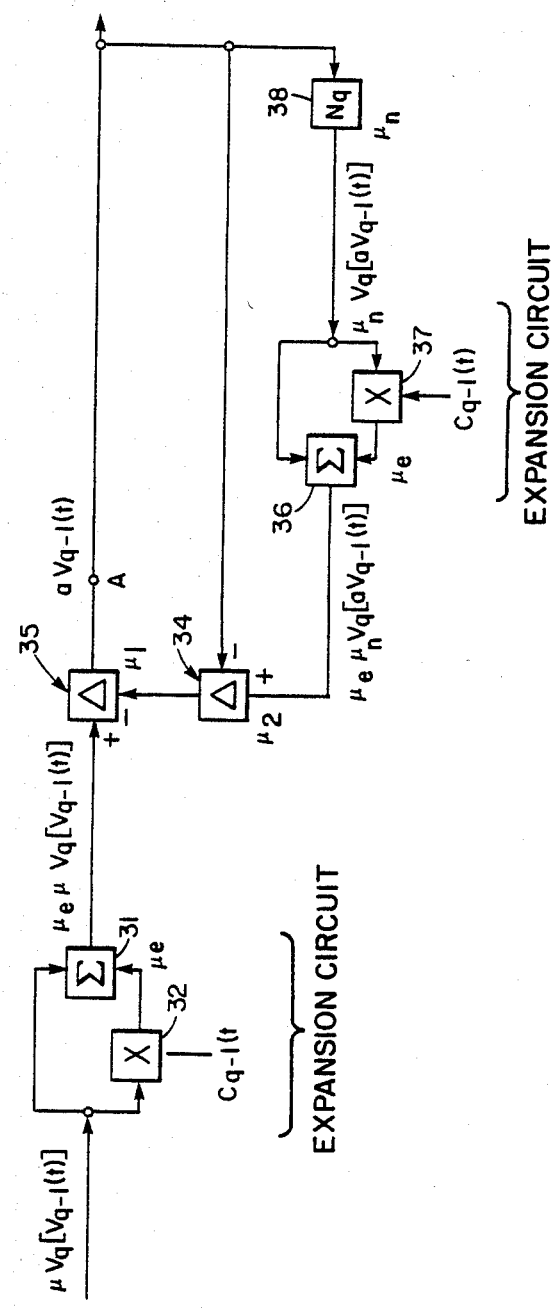
FIG. 8 is yet another simplified version of the schematic shown in FIG. 5.

Referring to FIG. 8 which is substantially identical to FIG. 6 previously discussed, the assumption is also made that the output of decoder stage, $D_q$, is at a different level and will be designated by $aV_{q-1}(t)$. In addition, there are transmission coefficients assigned to each of the key circuit elements that make up the decoder stage. The value of each is greater or less than one, indicating a signal level gain or loss, respectively and each coefficient is defined in FIG. 8. At point A in the figure, the following equation can be written:

$$aV_{q-1}(t) = uu_1u_eV_q[V_{q-1}(t)] - u_1u_2u_eu_nV_q[aV_{q-1}(t)] + u_1u_2aV_{q-1}(t),$$

where:

$$V_q[V_{q-1}(t)] = V_{q-1}(t) + kV_{q-1}^2(t),$$

and:

$$V_q[aV_{q-1}(t)] = aV_{q-1}(t) + k[aV_{q-1}(t)]^2 = aV_{q-1}(t) + a^2kV_{q-1}^2(t).$$

Since signal levels are being analyzed, the level of the $V_{q-1}(t)$ term and the $V_{q-1}^2(t)$ term can be treated independently of one another; therefore, two sets of equations are obtained from the above expression. The equation involving only the $V_{q-1}(t)$ terms is:

$$aV_{q-1}(t) = uu_1u_eV_{q-1}(t) - u_1u_2u_eu_naV_{q-1}(t) + u_1u_2aV_{q-1}(t),$$

and for the $V_{q-1}^2(t)$ term is:

$$0 = uu_1u_eV_{q-1}^2(t) - u_1u_2u_eu_na^2V_{q-1}^2(t).$$

From the equation involving $V_{q-1}(t)$, there results $$a = u[u_1u_e/(1 + u_1u_2u_eu_n - u_1u_2)]$$

and from the equation involving $V_{q-1}^2(t)$, there results:

$$a^2 = u/(u_2u_n).$$

The above results indicate that to determine the value of "a," there is a fairly complex relationship between the various key circuit coefficients. To make the analysis trackable, it will be assumed that:

$$u_1u_2 = 1$$

which can readily be obtained in practice. The equation for "a" obtained from the $V_{q-1}(t)$ terms then becomes:

$$a = u/u_2u_n,$$

and the equation from the $V_{q-1}^2(t)$ terms remains as:

$$a^2 = u/u_2u_n.$$

These results indicate that:

$$a = 1$$

and consequently:

$$u_2u_n = u.$$

This result indicates that there are two key circuit signal level coefficients that can be adjusted such that their product equals the signal level coefficient "u." As mentioned above, "u" can include the signal level gain and loss through many encoders and decoders, as well as, the signal level effects of the transmission medium. Because of the complexity involved in: (a) determining the value of these coefficients; and (b) tailoring the coefficients of the key circuits for each encoder and decoder stage to conform for a particular value of "u," it is advantageous but not absolutely necessary to design the circuits such that:

$$u_1 = u_2 = u_n = u = 1.$$

Figure 9:
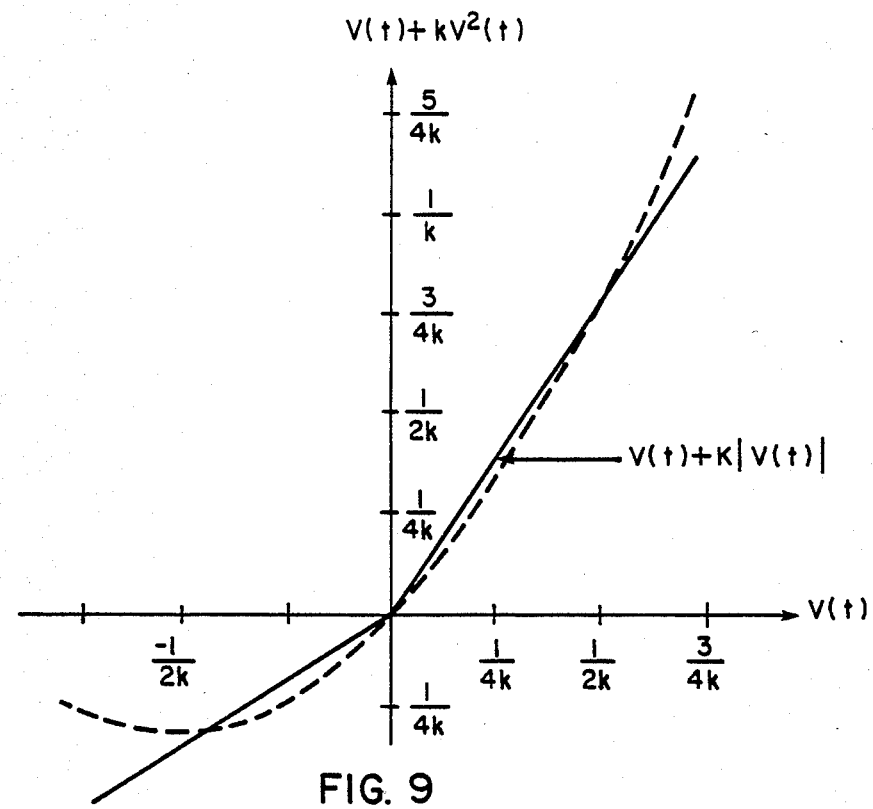
FIG. 9 is a graph showing the characteristics of a nonlinear and piecewise linear device used in the encoder of FIG. 4.

An alternate method of earmarking the input signal to an encoder stage involves replacing the two-quadrant square-law device 22 with a device that is a piecewise-linear approximation to it. FIG. 9 is a plot of the input-output characteristic of the earmarking process for the two-quadrant square-law device and, superimposed thereon, the piecewise-linear approximation. The earmarked signal using a piecewise-linear circuit may be expressed as:

$$V_{q-1}(t) + K|V_{q-1}(t)|,$$

where $|V_{q-1}(t)|$ is obtained from a full-wave rectification circuit and K is a constant that represents the amount of rectified signal that is added to the encoder stage input signal $V_{q-1}(t)$. The superimposed plot of the piecewise-linear approximation, in FIG. 9, indicates a value of K of about $\frac{1}{2}$. Since there is no mathematical expression for $|V_{q-1}(t)|$, where $V_{q-1}(t)$ is a general multitone signal, the following contention is made:

The full-wave rectification of the input signal to an encoder stage, $N_q$, where the input signal is a multitone signal expressed as:

$$V_{q-1}(t) = \sum_{n=1}^{N} v_n \cos(w_n t + a_n),$$

results in the generation of a signal spectrum abundant in harmonics. The harmonics are of sufficient quantity and of significant level to provide an earmarking of the input signal, $V_{q-1}(t)$, so as to effectively replace the two-quadrant square-law device in the encoder stage.

An argument that supports this contention is made when a single-tone, expressed as:

$$V_{q-1}(t) = v_n \cos(w_n t),$$

is assumed as the input signal to the encoder stage $N_q$. The output of the encoder stage would be:

$$V_q(t) = [v_n \cos(w_n t) + K|v_n \cos(w_n t)|][1 + m_1 A_{q-1}(t)]*(1/\pi t) \sin(W_{q-1}t/2).$$

Since:

$$|v_n \cos(w_n t)| = v_n| \cos(w_n t)|,$$

and:

$$|\cos(w_n t)| = 2/\pi - \sum_{n=1}^{\infty} (-1)^n (4/\pi)(1/(4n^2 - 1))\cos(2nw_n t)$$

then:

$$V_q(t) = \left\{ v_n \cos(w_n t) + K\left[ 2/\pi - (4/\pi) \sum_{n=1}^{\infty} ((-1)^n (4/n^2 - 1))\cos(2nw_n t) \right] \right\} [1 + m_1 A_{q-1}(t)]*(1/\pi t)\sin(W_{q-1}t/2)$$

Figure 10:
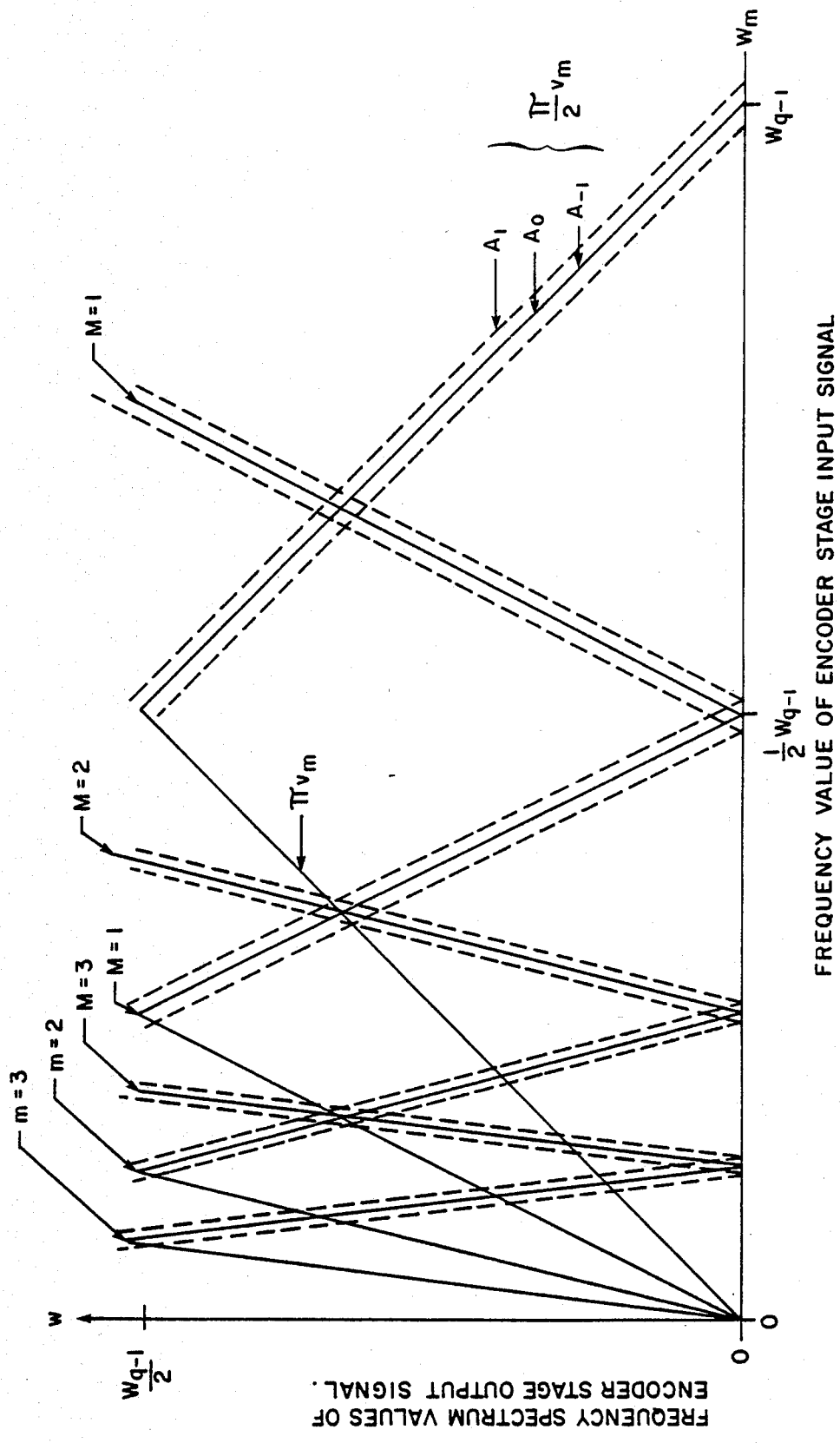
FIG. 10 is a graph showing the frequency spectrum of the encoder for various signal conditions.

A plot of the locus of the positive frequency spectrum of the output signal from the encoder stage $N_q$ is given in FIG. 10. It appears, from an inspection of this plot, that the distinguishability of $w_n$ and $v_n$, for any $w_n$ in the range:

$$0 \leq w_n < W_{q-1},$$

is readily established.

Since this earmarking method is piecewise-linear, there is a discontinuity between the two linear portions that is located at $V_{q-1}(t) = 0$; therefore, the presence of a d.c. component in the signal spectrum of the input signal to the encoder stage will affect the harmonic generation and if large enough, could eliminate it completely; consequently, this alternate earmarking approach may be utilized for signals requiring no d.c. component.

This alternate earmarking method does, however, eliminate some of the stringent requirements on the key circuit transmission coefficients of the decoder. In particular, the requirement on the transmission medium coefficient, "u," is greatly relaxed. Referring to FIG. 8, the following equation can be written for the signal at point A:

$$aV_{q-1}(t) = uu_1 u_e V_q[V_{q-1}(-t)] - u_1 u_2 u_e u_n V_q[aV_{q-1}(t)] + u_1 u_2 aV_{q-1}(t),$$

where $$V_q[V_{q-1}(t)] = V_{q-1}(t) + K|V_{q-1}(t)|,$$

and $$V_q[aV_{q-1}(t)] = aV_{q-1}(t) + K|aV_{q-1}(t)|$$
$$= aV_{q-1}(t) + Ka|V_{q-1}(t)|$$
$$= aV_q[V_{q-1}(t)].$$

Two sets of equations are derived from the above expression, one involving the terms associated with $V_{q-1}(t)$ and the other for the terms associated with $|V_{q-1}(t)|$. The equation involving only the $V_{q-1}(t)$ terms is:

$$aV_{q-1}(t) = uu_1 u_e V_{q-1}(t) - u_1 u_2 u_e u_n aV_{q-1}(t) + u_1 u_2 aV_{q-1}(t),$$

and for the $|V_{q-1}(t)|$ terms is:

$$0 = uu_1 u_e |V_{q-1}(t)| - u_1 u_2 u_e u_n a|V_{q-1}(t)|.$$

From the equation involving the $V_{q-1}(t)$ terms there results:

$$a = u[u_1 u_2/(1 + u_1 u_2 u_e u_n - u_1 u_2)],$$

and from the equation involving the $|V_{q-1}(t)|$ terms, there results:

$$a = u/u_2 u_n.$$

A fortunate simplification occurs if the decoder stage is designed so that:

$$u_1 u_2 = 1.$$

If this is the case, then the equation involving the $V_{q-1}(t)$ terms and the equation involving the $|V_{q-1}(t)|$ terms result in the same equation for "a," that is:

$$a = u/u_2 u_n.$$

Both $u_2$ and $u_n$ are circuit design constants of the decoder stage, $D_q$, and can have any desired value; however, this means that whatever their value, the value of "a" will be proportional to the value of "u" and have no effect on proper decoder operation. The end result is that the design of any decoder stage only requires that:

$$u_1 u_2 = 1,$$

to eliminate the requirement that the value of "u" be known. This eliminates the need for a particular signal level requirement for the transmission medium. Also, if:

$$u_2 u_n > u,$$

then the feedback in the decoder stage loop is negative which provides a more stable operation of the decoder stage.

Figure 11:
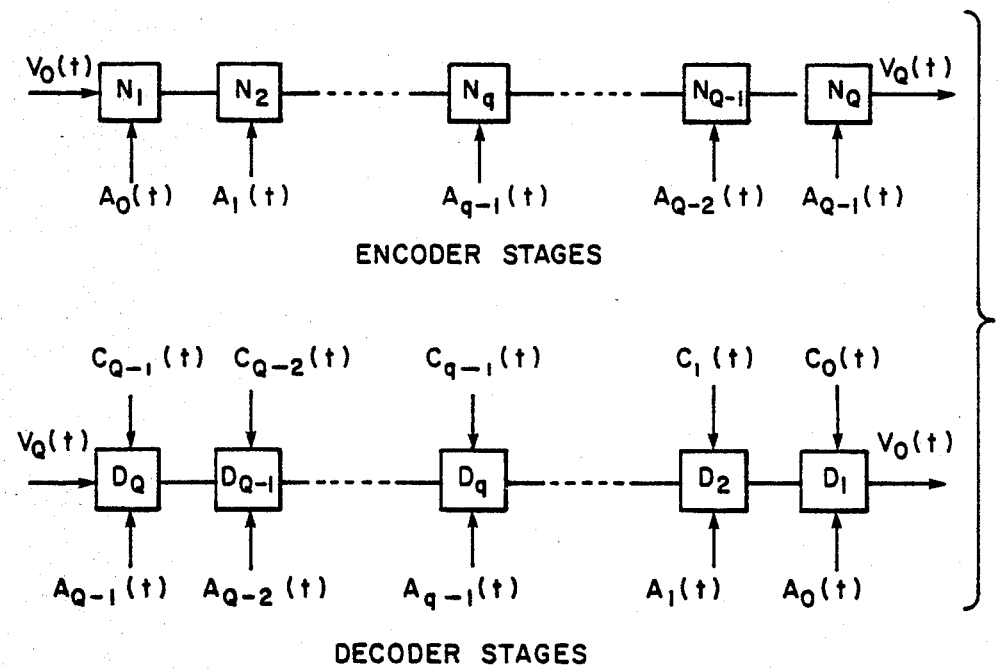
FIG. 11 is a block schematic diagram illustrating the frequency relationship between the carrier frequency sources in the encoder and decoder.
Figure 12:
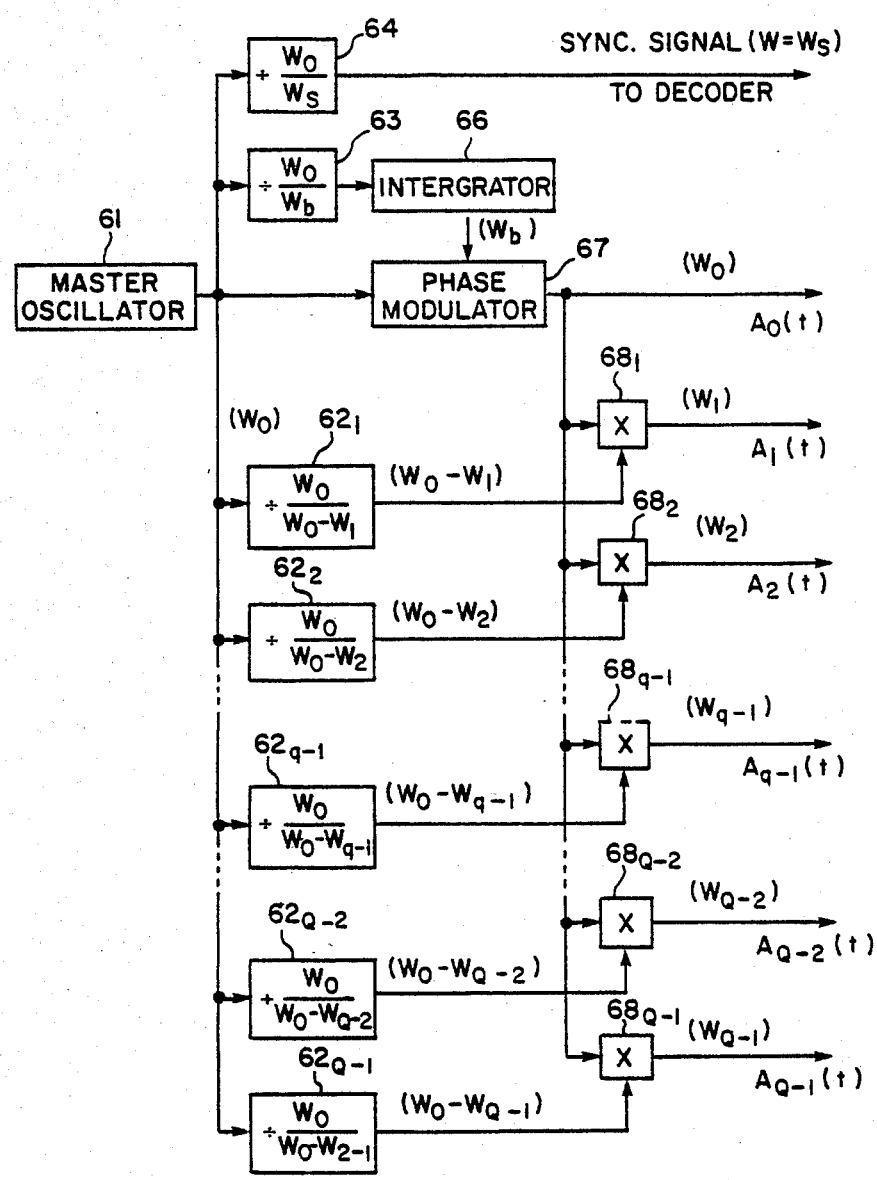
FIG. 12 is a block schematic diagram of an illustrative circuit for generating all the carrier frequencies needed by a Q-stage encoder.

The carriers, $A_{q-1}(t)$ and $C_{q-1}(t)$, for each encoder and decoder stage require synchronization for proper reconstruction of the signal $V_{q-1}(t)$. FIG. 11 indicates the carriers required for an encoder and decoder system comprising Q stages each. FIG. 12 discloses one suitable method of obtaining the required carriers for each encoder stage, as well as the synchronizing signal which is transmitted to the decoder system. As shown, a master oscillator 61, for example, a crystal-controlled oscillator in an oven, feeds a plurality of frequency dividers $62_1$–$62_{Q-1}$, and two additional dividers 63 and 64, respectively. The output of divider 63 is fed to an integrator 66 thence to a phase modulator 67 which receives as its input a direct output from oscillator 61. The output from divider 64 comprises the synchronizing signal transmitted to the decoder. A plurality of multipliers $68_1$–$68_{Q-1}$ multiply the output of the corresponding frequency divider with the output of phase modulator 67.

The synchronizing signal from divider 64 can be transmitted along with the reduced bandwidth signal by selecting a frequency that falls just outside the bandwidth of the encoder output signal. At the decoder, this signal can be extracted and used in the synchronization of the decoder carriers. Alternatively, the synchronizing signal may be transmitted, for security reasons, over a completely different transmission medium. In this latter event, care must be taken to match the two transmission facilities for absolute and relative delay and phase characteristics.

The method employed herein to describe the instant invention was strongly influenced by the extent of the mathematical analysis that could be provided to support the contention that unlimited, real-time, bandwidth reduction can be obtained for any bandwidth-limited message signal. This clarity was maintained because of the one-to-one correspondence between the circuit element parameters and carrier signals of the encoder stage, $N_q$, and the corresponding decoder stage, $D_q$. There are, however, strong mathematical inferences that allow a significant simplification of the overall encoder/decoder circuitry, albeit without rigorous mathematical support. These simplifications are significant to the point where the theoretical minimum number of encoder stages can be, in practice, realized and only one low-pass filter is required regardless of the total number of encoder stages. Also, there results the need for only one decoder stage, regardless of the extent of bandwidth reduction, since total reconstruction of the reduced bandwidth signal can be accomplished by the use of the multi-stage encoder within the single-stage decoder.

To accomplish this end, the modified encoder stage shown in FIG. 15 is used. This encoder stage is identical to the encoder stage shown in FIG. 4 except that it is modified by the removal of low-pass filter 27. Also, the modified encoder stage shown in FIG. 15 depicts the first stage of signal encoding instead of an arbitrary $q^{th}$ stage of signal encoding. The method of signal processing and the function of each circuit element 21, 22, 23, 24 and 26 of the modified encoder stage shown in FIG. 15 is identical to the description given for the encoder stage of FIG. 4.

The original message signal, $v_o(t)$, is connected to one input of a first summing circuit 21 which has as its other input the output of a two-quadrant, square-law device or piecewise-linear device 22. The output of summing circuit 21 forms one input of a second summing circuit 23. The other input to summing circuit 23 comprises the output of a multiplier 24 having as one input the output of first summing circuit 21 and as the other input the output of an angle modulator 26. The signal from the output of summing circuit 23 is designated as V′$_1$(t) and can be expressed as:

$$V'_1(t) = [V_o(t) + kV_o^2(t)][1 + m_1 A_o(t)],$$

or:

$$V'_1(t) = [V_o(t) + k|V_o(t)|][1 + m_1 A_o(t)],$$

where $m_1$, is an arbitrary constant and includes the input-output signal level relationships of multiplier 24 and $A_o(t)$ is expressed, as before, as:

$$A_o(t) = A \cos[W_o t + P(t)].$$

Since the original message signal is designated as $V_o(t)$ which has a finite bandwidth designated as $W_o$, the output signal V′$_1$(t), at the output of the modified encoder stage, FIG. 15, has a bandwidth greater than $W_o$ as a result of the introduction of the angle modulated carrier $A_o(t)$ which consists of a carrier frequency of $W_o$ (r=o term). Since there is no filtering of this signal at the output of the modified encoder stage, the output signal, V′$_1$(t), is uniquely related to the input signal, $V_o(t)$, that is:

$$V'_1(t) = V_1[V_o(t)].$$

Since it was previously shown that the output signal of the encoder stage shown in FIG. 4, which utilizes a low-pass filter 27, was limited to a bandwidth of $W_o/2$, and still retains its unique relationship with the input signal to the encoder stage, it, therefore, can be readily deduced that V′$_1$(t), whose spectral bandwidth extends well beyond $W_o/2$, is uniquely related to $V_o(t)$ when its signal spectrum less than $W_o/2$ is only considered and any remaining spectrum greater than $W_o/2$ is ignored. What can be inferred, at this point, is that the output signal of the modified encoder stage, shown in FIG. 15, contains more spectrum than is necessary to convey the signal information contained in the input signal. Consequently, any signal processing in a subsequent modified encoder stage need only consider, after earmarking, the spectrum folding of that portion of this output signal, V′$_1$(t), as if its bandwidth were only $W_o/2$.

An arbitrary modified encoder stage, $N_q'$, can, therefore, be schematically represented as shown in FIG. 16. The input signal is designated as V′$_{q-1}$(t) and the output signal is designated as V′$_q$(t). If the theoretical maximum bandwidth reduction per encoder stage is assumed, then that portion of the input signal's spectrum that uniquely contains all of the original message signal's information lies in the spectrum region defined by:

$$0 \leq w < W_o/2^{q-1}.$$

The modified encoder stage's output signal, therefore, uniquely contains all of the original message signal's information in the spectrum region defined by:

$$0 \leq w < W_o/2^q.$$

Figure 17:
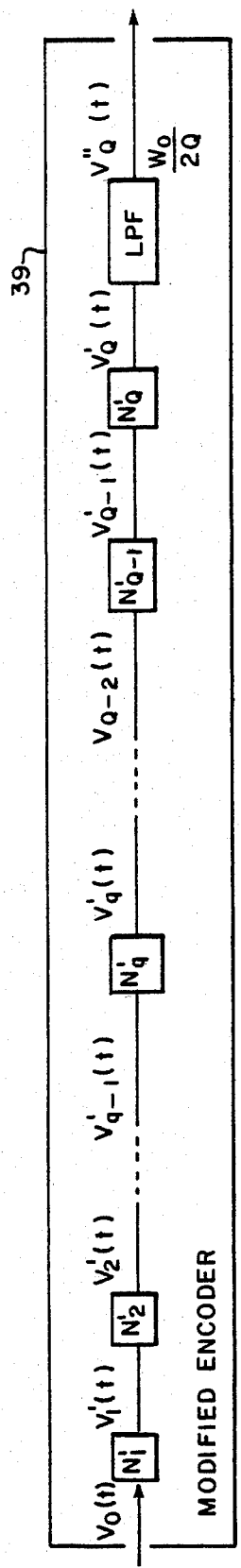
FIG. 17 is a block schematic diagram of yet another alternate encoder for use in the system of FIG. 1.

A modified encoder that is significantly simpler than the encoder 10 previously described is schematically shown in FIG. 17. With the input signal to the modified encoder being the original message signal, $V_o(t)$, with a finite bandwidth, $W_o$, the output signal, V′$_Q$(t), from the last modified encoder stage, $N'_Q$, will be, by transitive law, uniquely related to the original message signal within a spectrum region defined by:

$$0 \leq w < W_o/2^Q.$$

Consequently, the low-pass filter at the output of the modified encoder need only have a passband of $W_o/2^Q$, or as close as possible to it. The output signal, $V''_Q(t)$, of the low-pass filter is the desired reduced bandwidth signal. This signal can therefore be expressed as:

$$V''_Q(t) = V''_Q[V_o(t)],$$

or inversely:

$$V''_Q{}^{-1}[V''_Q(t)] = V_o(t).$$

Figure 18:
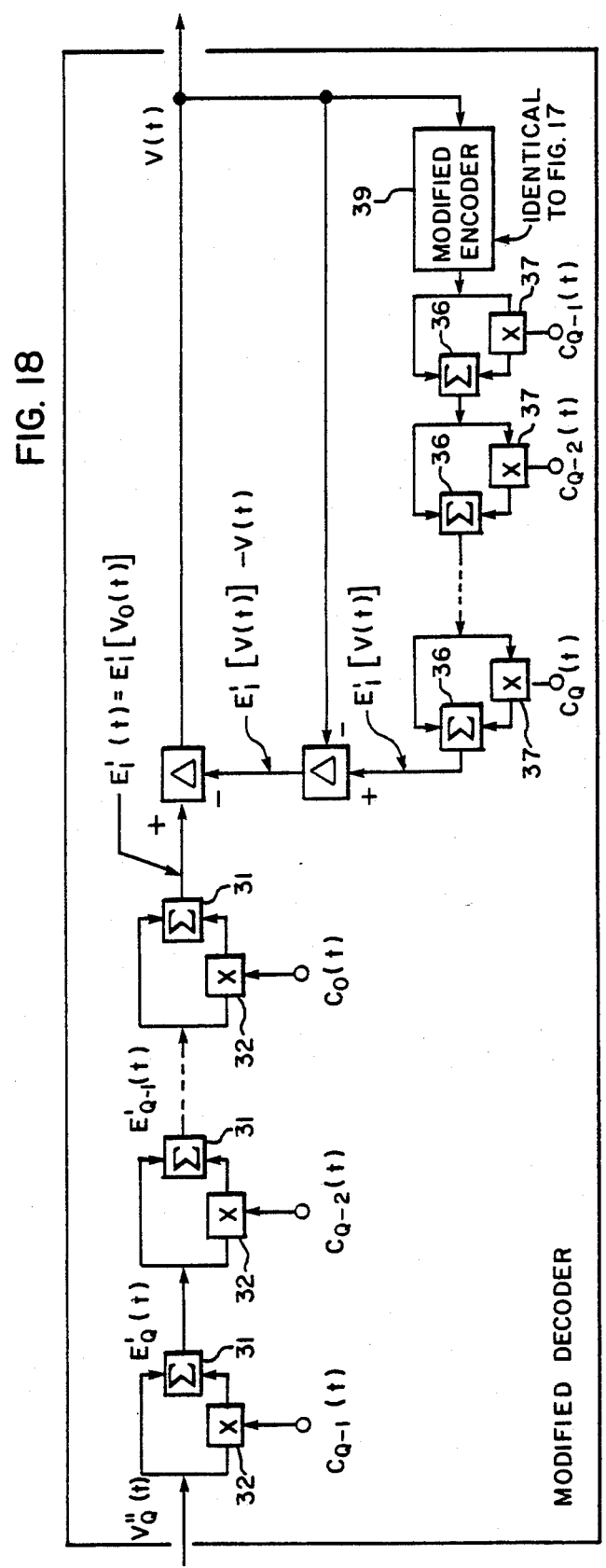
FIG. 18 is a block schematic diagram of an alternate embodiment of a decoder for use in the system of FIG. 1.

A modified decoder circuit required to reconstruct the original message signal is schematically shown in FIG. 18. The method of signal processing and the function of each circuit element 31, 32, 33, 34, 36 and 37 of the modified decoder is identical to the description given for the decoder stage of FIG. 5. The difference between the modified decoder circuit of FIG. 18 and the decoder stage of FIG. 5 is that a modified encoder 39 is used in the modified decoder circuit in place of the encoder stage 38 used in the decoder stage of FIG. 5 and the signal processing circuitry for the generation of each expanded signal, $E_q[V_o(t)]$, for each decoder stage, FIG. 5, utilizing the circuit elements 31 and 32 as the input to the differencing circuit 33, are serially placed together as shown in FIG. 18 and likewise; for each expanded signal $E_q[V(t)]$, for each decoder stage, FIG. 5, utilizing the circuit elements 36 and 37 as the input to the differencing circuit 34, are serially placed together as shown in FIG. 18.

The input signal to the modified decoder is the desired reduced bandwidth signal, $V''_Q(t)$, that has all the original message spectral information uniquely contained within a spectral bandwidth of $W_o/2^Q$. This input signal is multiplied in multiplier 32 by a carrier, $C_{Q-1}(t)$, of constant amplitude C and a radian frequency numerically equal to $W_o/2^{Q-1}$. The output from multiplier 32 is combined with the reduced bandwidth input signal in summing circuit 31 and the resulting signal is an expanded bandwidth signal designated $E'_Q(t)$, and may be expressed as:

$$E'_Q(t) = V''_Q(t) + m_2 V''_Q(t) C_{Q-1}(t),$$

where $m_2$ is an arbitrary constant and includes the input-output signal level relationship of multiplier 32. No filtering is involved in the generation of $E'_Q(t)$ and consequently this signal is uniquely related to the reduced bandwidth input signal $V''_Q(t)$, that is:

$$E'_Q(t) = E'_Q[V''_Q(t)].$$

Similarly, $E'_Q(t)$ is multiplied by multiplier 32 by a carrier, $C_{Q-2}(t)$, of constant amplitude C and a radian frequency numerically equal to $W_o/2^{Q-2}$. The output from multiplier 32 is combined with the signal $E'_Q(t)$ in summing circuit 31 and the resulting signal is an expanded bandwidth signal designated $E'_{Q-1}(t)$, and may be expressed as:

$$E'_{Q-1}(t) = E'_Q(t) + m_2 E'_Q(t) C_{Q-2}(t).$$

This process of generating expanded bandwidth signals of the form:

$$E'_{q-1}(t) = E'_q(t) + m_2 E'_q(t) C_{q-2}(t),$$

is continued for a total of Q times utilizing the signal processing method in all cases as described above until the final expanded signal $E'_1(t)$ is obtained. $E'_1(t)$ would therefore be expressed as:

$$E'_1(t) = E'_2(t) + m_2 E'_1(t) C_o(t).$$

Since no filtering was used in the generation of any of the expanded bandwidth signals, the following can be stated:

$$E'_1(t) = E'_1[E'_2(t)],$$

$$E'_2(t) = E'_2[E'_3(t)],$$

and so on until $$E'_{Q-1}(t) = E'_{Q-1}[E'_Q(t)],$$

and finally, $$E'_Q(t) = E'_Q[V''_Q(t)].$$

Since, by mathematical inference, as described above, that:

$$V''_Q(t) = V''_Q[V_o(t)],$$

then it can be concluded, by transitive law that:

$$E'_1(t) = E'_1[V_o(t)],$$

or inversely:

$$E'_1{}^{-1}[E'_1(t)] = E'_1{}^{-1}\{E_1[V_o(t)]\} = V_o(t)$$

The controlling mathematical equations from the description of the decoder stage, $D_q$, in FIG. 6 for proper operation of the decoder stage were:

$$E_q[V(t)] = E_q[V_{q-1}(t)],$$

and that $V_{q-1}(t)$ be explicitly contained in the expanded signal $E_q[V_{q-1}(t)]$, that is:

$$E_q[V_{q-1}(t)] = V_{q-1}(t) + R_q(t).$$

The explicitness of $V_{q-1}(t)$ in $E_q[V_{q-1}(t)]$ was insured if:

$$m_1 m_2 A C J_o(p_2 B/W_b) = 4.$$

For the present case of the modified decoder of FIG. 18, the same controlling equations apply and take the following form:

$$E'_1[V(t)] = E'_1[V_o(t)],$$

and:

$$E'_1[V_o(t)] = V_o(t) + R'_1(t).$$

Since the signal spectrums involved in the encoding of the original message signal using the modified encoder of FIG. 17 are, at least, equal to the signal spectrums that were contained in the encoder stages of FIG. 4 and all carrier signals used by the multipliers 24, can be made identical, it is not unreasonable to deduce that $V_o(t)$ is explicitly contained in $E'_1[V_o(t)]$ and that the above-stated mathematical inference is valid. Therefore, since:

$$E'_1{}^{-1}[E'_1(t)] = E'_1{}^{-1}\{E'_1[V_o(t)]\} = V_o(t)$$

then:

$$E'_1{}^{-1}\{E'_1[V(t)]\} = V(t);$$

therefore:

$$V(t) = V_o(t).$$

Figure 13:
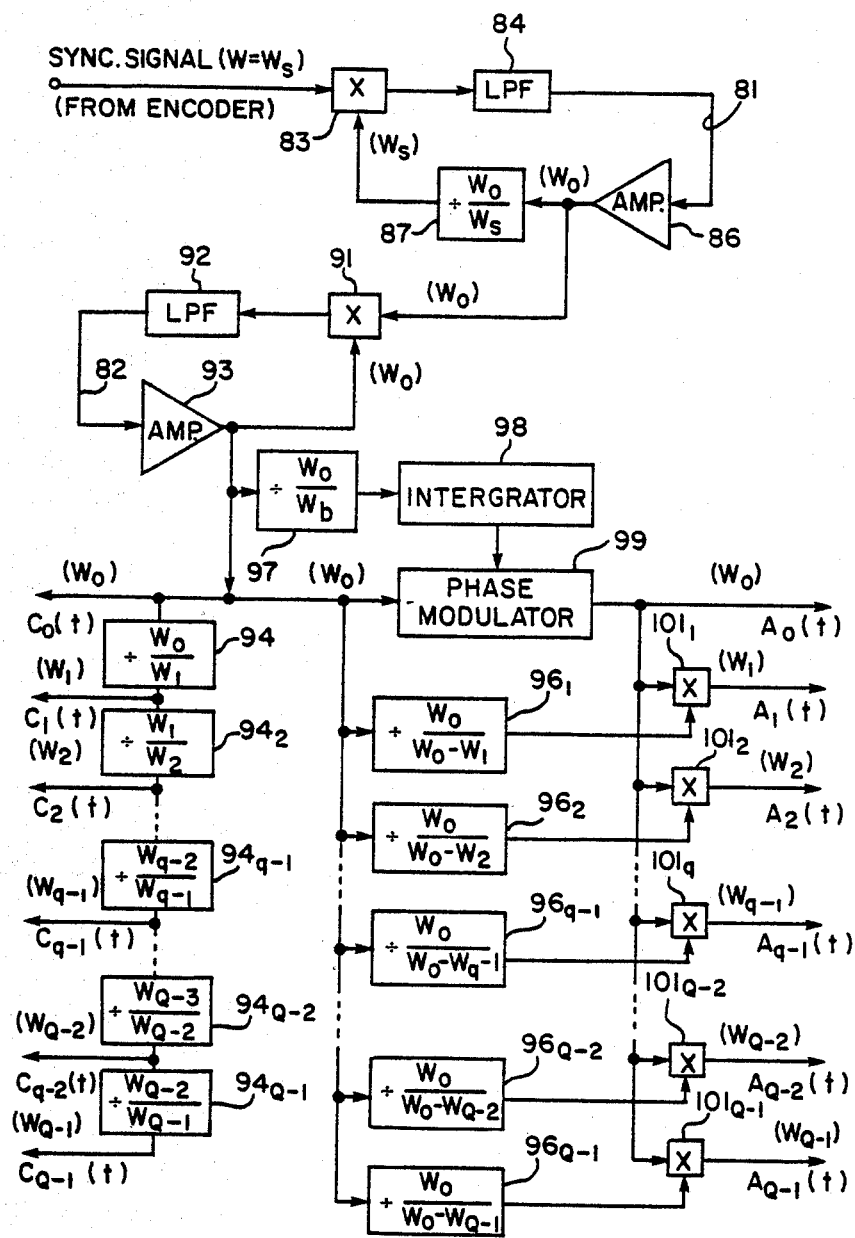
FIG. 13 is a block schematic diagram of an illustrative circuit for generating all the carrier frequencies needed by a Q-stage decoder.

One illustrative method that can be utilized for the synchronization of the decoder carriers is given in FIG. 13. It should be noted that this circuit includes two phase-locked loop circuits 81 and 82, respectively. Phase lock circuit 81 is used as a frequency multiplier while phase lock circuit 82 is required to provide proper phasing for the carriers. As shown, phase-lock circuit 81 includes a multiplier 83, a low-pass filter 84, an amplifier 86 and a frequency divider 87 to close the loop. In like fashion, phase-lock circuit 82 includes a multiplier 91, a low-pass filter 92 and an amplifier 93. The output of amplifier 93 is connected to a first plurality of frequency dividers $94_1$–$94_{Q-1}$ and a second plurality of frequency dividers $96_1$–$96_{Q-1}$. The output of amplifier 93 is also connected to a frequency divider 97 thence, via an integrator 98, to a phase modulator 99. A plurality of multiplier stages $101_1$–$101_{Q-1}$ are connected to the output of phase-modulator 99 and to the output of the frequency dividers $96_1$–$96_{Q-1}$.

The invention has been described with reference to bandwidth reduction in a communications system; however, if signal transmission medium 11 in FIG. 11 were replaced with a signal storage medium, such as a magnetic tape recorder or an audio disc, the bandwidth reduction would be equally effective. Thus, bandwidth signals, such as a television picture, could be recorded on an ordinary audio disc or cassette. Further, TV signals need no longer be broadcast over the VHF or UHF bands but could, instead, be broadcast over conventional MF or LF bands. Further, since successful regeneration of the band-compressed signals requires knowledge, at the decoder, of the frequencies used at the encoder to fold the signals, the instant invention may also be used for signal encryption.

The multipliers, summing circuits, differencing circuits, frequency-dividers, etc. shown in the drawings are all well-known, standard designs and per se form no part of the claimed invention.

One skilled in the art may make various changes and substitutions to the layout of parts shown without departing from the spirit and scope of the invention.

APPENDIX A

Determining the value of "k"

The constant "k" represents the ratio of the amplitude of the output signal of the two-quadrant square-law device to the amplitude of the input signal. As will subsequently be discussed in Appendix B, the restrictions on the value of "k" are dependent upon the amplitudes of the spectral components of the signal, that is on $v_n$, rather than on the amplitude of $V_{q-1}(t)$. When the characteristics of the input signal to the encoder are known; in particular, if the value of the maximum amplitude of any one of its spectral components is known, then "k" can be selected by setting:

$$k = 1/V_o,$$

where $$V_o > V_{n(max)}.$$

This will determine an output level for the two-quadrant square-law device, and will insure that any of the restrictions placed upon $v_n$ will not be violated.

APPENDIX B

Proof of Uniqueness

As stated in the description of the encoder 10, the output signal from encoder stage "$N_q$" may be expressed as:

$$V_q(t) = [V_{q-1}(t) + kV^2{}_{q-1}(t)][1 + m_1 A_{q-1}(t)]*(1/\pi t) \sin(W_{q-1}t/2).$$

In general, $V_{q-1}(t)$ is a multitone signal comprising a sum of single-tones, $v_n(t)$, and may be expressed as:

$$V_{q-1}(t) = \sum_{n=1}^{N} v_n(t),$$

where:

$$v_n(t) = v_n \cos(w_n t + a_n);$$

therefore, $V_{q-1}(t)$ may be expressed as:

$$V_q(t) = \left\{ \sum_{n=1}^{N} v_n(t) + k\left[\sum_{n=1}^{N} v_n(t)\right]^2 \right\} [1 +$$

$$m_1 A_{q-1}(t)]*(1/\pi t)\sin(W_{q-1}t/2)$$

$$= \left[ \sum_{n=1}^{N} v_n(t) + k \sum_{m=1}^{M} \sum_{n=1}^{N} v_m(t)v_n(t) \right] [1 +$$

$$m_1 A_{q-1}(t)]*(1/\pi t)\sin(W_{q-1}t/2), M = N.$$

The above equation for $V_q(t)$ can be reformulated where the m=n terms of the double summation are combined with the single summation terms; thus:

$$V_q(t) = \left\{ \sum_{n=1}^{N} [v_n(t) + kv_n^2(t)] + k \sum_{m=1}^{M} \sum_{n=1}^{N} v_m(t)v_n(t) \right\} [1 +$$

$$m_1 A_{q-1}(t)]*(1/\pi t)\sin(W_{q-1}t/2), m \neq n.$$

$$= \left\{ \sum_{n=1}^{N} [v_n(t) + kv_n^2(t)] \right\} [1 +$$

$$m_1 A_{q-1}(t)]*(1/\pi t)\sin(W_{q-1}t/2) +$$

$$\left[ k \sum_{m=1}^{M} \sum_{n=1}^{N} v_m(t)v_n(t) \right] [1 + m_1 A_{q-1}(t)]*(1/\pi t)\sin(W_{q-1}t/2)$$

$$= S_q(t) + X_q(t)$$

where:

$$S_q(t) = \sum_{n=1}^{N} s_n(t)$$

and $$X_q(t) = k \sum_{m=1}^{M} \sum_{n=1}^{N} x_{mn}(t),$$

which allows $s_n(t)$ and $x_{mn}(t)$ to be defined as:

$$s_n(t) = [v_n(t) + kv_n^2(t)][1 + m_1 A_{q-1}(t)]*(1/\pi t) \sin(W_{q-1}t/2),$$

and:

$$x_{mn}(t) = v_m(t)v_n(t)[1 + m_1 A_{q-1}(t)]*(1/\pi t) \sin(W_{q-1}t/2).$$

It can be stated that the output signal from the encoder stage "$N_q$" is a function of the input signal to this encoder stage, that is:

$$V_q(t) = V_q[V_{q-1}(t)],$$

and also, that this same input signal is a function of a sum of single-tones, that is:

$$V_{q-1}(t) = V_{q-1}\left[\sum_{n=1}^{N} v_n(t)\right]$$

therefore, by transitive law:

$$V_q(t) = V_q[V_{q-1}(t)] = V_q\left[\sum_{n=1}^{N} v_n(t)\right].$$

If the input signal to the encoder stage were only a single-tone signal, that is:

$$V_{q-1}(t) = v_n(t)$$

then the output signal from the encoder stage would be:

$$V_q(t) = S_q(t) = s_n(t); \quad X_q(t) = 0,$$

noting that $s_n(t)$ is the same function of $v_n(t)$, as $V_{q-1}(t)$ is of $\sum_{n=1}^{N} v_n(t)$, that is:

$$s_n(t) = V_q[v_n(t)].$$

If it is proven that the output signal from an encoder stage, that is the result of a single-tone input signal is uniquely related to the input single-tone, that is:

$$V_q^{-1}[s_n(t)] = v_n(t)$$

then:

$$V_{q-1}(t) = \sum_{n=1}^{N} v_n(t) = \sum_{n=1}^{N} v_q^{-1}[s_n(t)];$$

and consequently:

$$V_q(t) = V_q[V_{q-1}(t)] = V_q\left\{\sum_{n=1}^{N} v_q^{-1}[s_n(t)]\right\},$$

which states that the output signal from an encoder stage, resulting from a general multitone input signal, can be completely described when the output signal, for each single-tone of the multitone signal, is known. If uniqueness is proven between $s_n(t)$ and $v_n(t)$, then uniqueness is established between $V_q(t)$ and $v_{q-1}(t)$, since:

$$V_q^{-1}[V_q(t)] = V_q^{-1}\left[V_q\left\{\sum_{n=1}^{N} V_q^{-1}[s_n(t)]\right\}\right]$$

$$= \sum_{n=1}^{N} V_q^{-1}[s_n(t)]$$

$$= V_{q-1}(t).$$

To establish the uniqueness, a further refinement of the expression for $s_n(t)$ is required. If the angle modulated carrier and multiplier constant are defined as:

$$m_1 A_{q-1}(t) = \sum_{r=-\infty}^{\infty} A_r \cos(W_{q-1}t + rW_b t)$$

where $$A_r = m_1 J_r(p_2 B/W_b)$$

then:

$$s_n(t) = [v_n(t) + kv_n^2(t)]\left[1 + \sum_{r=-\infty}^{\infty} A_r \cos(W_{q-1}t + rW_b t)\right]*(1/\pi t)\sin(W_{q-1}t/2).$$

If the sinusoidal form of $v_n(t)$, that is:

$$v_n(t) = v_n \cos(w_n t + a_n)$$

is substituted into the above expression for $s_n(t)$ and then expanded, the expression given in Table I(6) results. This expression in Table I is in the time domain; however, the proof will be carried out in the frequency domain. Utilizing Fourier Transforms as defined in Table I(1)-(5), the expression for $s_n(w)$ results and is given in Table I(7).

In order to provide a trackable proof, some arbitrary, but practical, restrictions are placed upon some of the variables associated with the expression for $s_n(w)$. These restrictions, in the eventual design of an encoder stage, need not be used. The first arbitrary restriction is:

$$W_b << W_Q.$$

The practical aspect of this restriction is that there will be sufficient sidebands produced in any intermediate encoder stage so that these sidebands will be visible in the reduced bandwidth output signal of the final encoder stage. This will ensure that any obscurity of the spectrum is virtually eliminated because of the spectrum folding in each stage of the encoder.

The second arbitrary restriction is that:

$$J_{|r|}(p_2B/W_b) > J_{|r|+1}(p_2B/W_b).$$

This requires that:

$$0 < p_2B/W_b < 1.$$

Since the value of the Bessel function decreases in magnitude, for this range of argument, as "r" increases, the significant sidebands will be relatively close in frequency to the carrier (r=0 term), compared to the range of frequency values for $w_n$.

Utilizing these restrictions, the expression for $s_n(w)$ can be simplified by the elimination of the insignificant spectral terms that would be virtually invisible in the pass-band of the encoder output, which is:

$$|w| \leq W_{q-1}/2.$$

The simplified expression is given in Table I(8).

Since $s_n(t)$ is a real signal in the time domain, then in the frequency domain: $s_n(-w) = s_n^*(w)$, (* denotes the complex conjugate) the expression for $s_n(w)$ needs only to be analyzed for positive w values. This consideration results in the expression given in Table I(9).

Figure 14:
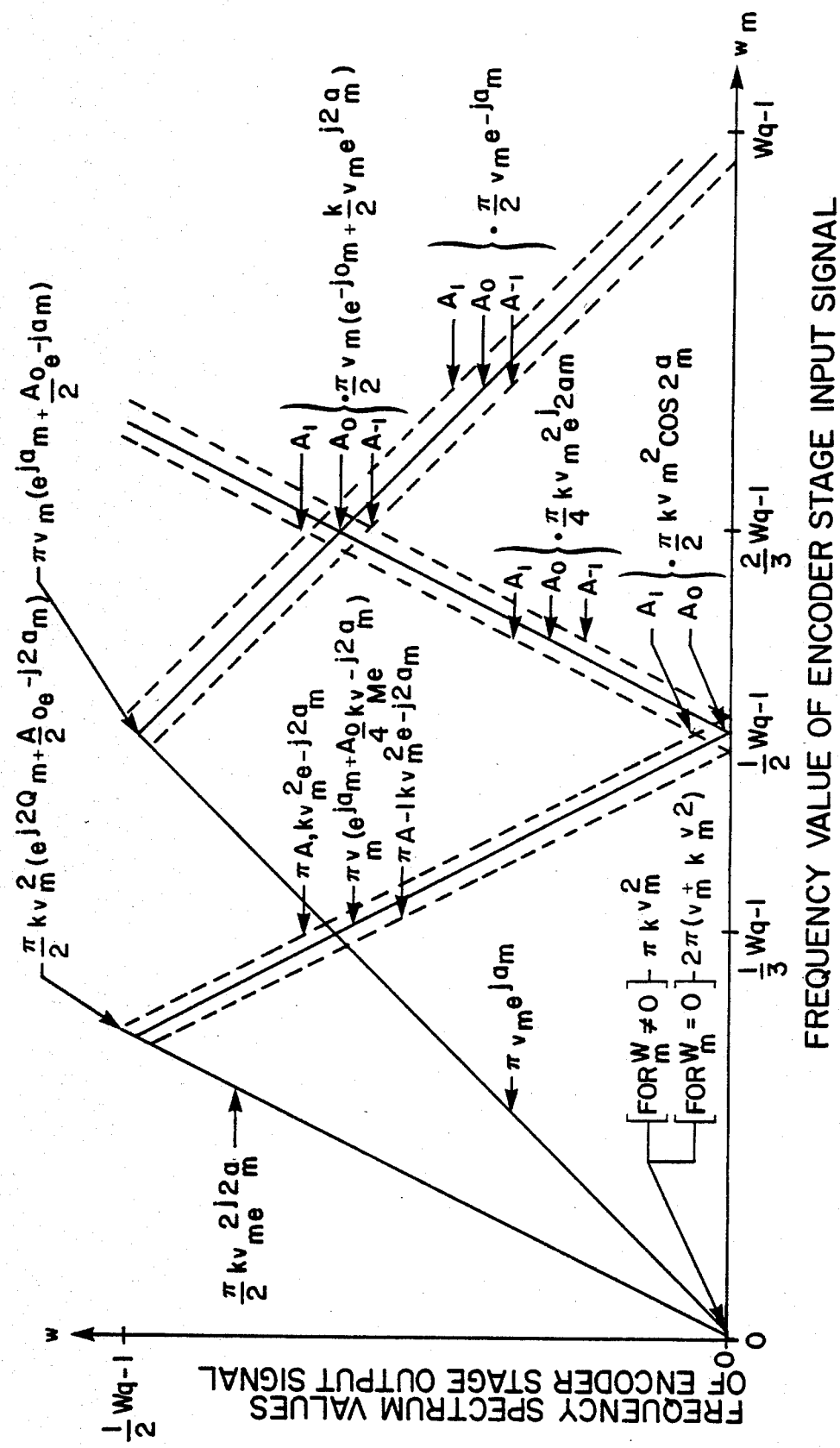
FIG. 14 is a graph depicting the frequency spectrum at the output of the encoder for a variety of signal conditions.

The equation in Table I(9) is represented by a plot of the locus of the position of the spectral terms in the encoder stage's output signal spectrum, w, as a function of the frequency value, $w_n$, of the single-tone input signal, which is given in FIG. 14. The single-tone input signal's frequency value is measured by the absicca and the location of the output spectral terms is measured by the ordinate. The complex amplitudes associated with the output signal's spectral terms are indicated on the locus plot. Since FIG. 14 plots the significant spectrum that appears in the encoder stage output signal in the frequency band of $W_{q-1}/2$, the plot includes only a portion of the unfolded earmarked signal and only a portion of the folded earmarked signal with its significant sidebands.

To prove the uniqueness between $s_n(t)$ and $v_n(t)$, the following hypothesis is used:

If two unequal single-tone signals, $v_1(t)$ and $v_2(t)$, are each assumed to be an input signal to the encoder stage and the corresponding resulting output signals, $s_1(t)$ and $s_2(t)$ are equal, an ambiguity has occurred and there is no uniqueness between $s_n(t)$ and $v_n(t)$; however, if the test fails, the hypothesis is false, and $s_n(t)$ is uniquely related to $v_n(t)$.

The tests are made by considering the unequal single-tones as input signals with frequency values in the range:

$$0 \leq w_n < W_{q-1}$$

and the corresponding output signals are evaluated in the frequency range:

$$0 \leq w \leq W_{q-1}/2.$$

Much of the hypothesis testing can be eliminated by an inspection of the plot of FIG. 14. The following observations can be made:

1. For a single-tone input signal $v_n(t)$, the output spectrum is completely distinguishable regardless of the frequency value, $w_n$, with the exception of the particular frequency values $w_n = W_{q-1}/3$ and $w_n = 2W_{q-1}/3$. Input signals at these values of frequency provide output spectrums that appear identical, consequently, $s_1(t)$ is presumed to be indistinguishable from $s_2(t)$; therefore, the unequal input single-tones $v_1(t)$ and $v_2(t)$ must be at least equal in frequency value; that is:

$$w_1 = w_2$$

except for the particular frequency values $W_{q-1}/3$ and $2W_{q-1}/3$.

2. For any single-tone input signal, $v_n(t)$, there is at least one distinguishable output spectral term that has a complex amplitude of the form:

$$v_n e^{ja_n},$$

except for the single-tone input signals having particular frequency values of $w_n = 0$, $W_{q-1}/3$ and $2W_{q-1}/3$; therefore, for any two single-tone input signals, $v_1(t)$ and $v_2(t)$, of any frequency value, excluding these particular values, the following can be proven:

$$v_1 = v_2,$$

and $$a_1 = a_2.$$

At this point, the hypothesis is false except at the particular frequency values indicated above; therefore, a mathematical analysis is required for the hypothesis testing for only these values. The testing will use four cases, each case will assume two unequal single-tone input signals, $v_1(t)$ and $v_2(t)$ with particular values of $w_1$ and $w_2$. The four cases are identified as follows:

Case I: $w_1 = W_{q-1}/3$, $w_2 = 2W_{q-1}/3$
Case II: $w_1 = w_2 = W_{q-1}/3$
Case III: $w_1 = w_2 = 2W_{q-1}/3$
Case IV: $w_1 = w_2 = 0$ Case I: The two unequal single-tone input signals are given as:

$$v_1(t) = v_1 \cos(W_{q-1}t/3 + a_1),$$

and:

$$v_2(t) = v_2 \cos(2W_{q-1}t/3 + a_2).$$

Referring to FIG. 14, the following equalities can be stated, assuming $s_1(w) = s_2(w)$:

$$\pi v_1 \left( e^{ja_1} + \frac{A_o}{4} k v_1 e^{-j2a_1} \right) =$$

$$(\pi/2) A_o v_2 \left( e^{-ja_2} + \frac{k}{2} v_2 e^{ja_2} \right),$$

and:

$$\frac{\pi}{4} A_1 \frac{k}{4} v_1^2 e^{-j2a1} = \frac{\pi}{2} A_1 v_2 \left( e^{-ja2} + \frac{k}{2} v_2 e^{ja2a2} \right)$$

therefore:

$$v_1 \left( e^{ja1} + \frac{A_o}{4} k v_1 e^{-j2a1} \right) = \frac{k}{4} v_1^2 e^{-j2a1},$$

or:

$$e^{ja1} + \frac{k}{4} v_1 (A_o - 1) e^{-j2a1} = 0,$$

which results in:

$$v_1 e^{-ja1} = -4/k(A_o - 1).$$

This result means that, if:

$A_o < 1,$ $a_1 = 0,$ $v_1 = 4/k(1 - A_o),$ or if:

$A_o > 1,$ $a_1 = \pi$ $v_1 = 4/k(A_o - 1),$ then a value of $v_2(t)$ can be found that will result in an ambiguity. To remove this ambiguity, a restriction is placed on the amplitude of any $v_n$ such that:

$v_n < |4/k(A_o - 1)|$

With this restriction, the above test would fail and the hypothesis would be false. It should be noted that if $A_o$ is selected such that:

$A_o = 1,$ then there is no practical value of $v_n$ that will result in an ambiguity and the hypothesis would be false for all values of $v_n$, except infinity.

Case II: The two unequal single-tone input signals are given as:

$v_1(t) = v_1 \cos(W_{q-1} t/3 + a_1),$ and:

$v_2(t) = v_2 \cos(W_{q-1} t/3 + a_2).$

Referring to FIG. 14, the following equalities can be stated, assuming $s_1(w) = s_2(w)$:

$$\pi v_1 \left( e^{ja1} + \frac{A_o}{4} k v_1^2 e^{-j2a1} \right) = \pi v_2 \left( e^{ja2} + \frac{A_o}{4} k v_2^2 e^{-j2a2} \right)$$

and:

$(\pi/4) A_1 k v_1^2 e^{-j2a1} = (\pi/4) A_1 k v_2^2 e^{-j2a2};$ therefore:

$v_1 e^{ja1} = v_2 e^{ja2},$ resulting in the equality:

$v_1 = v_2,$ and:

$a_1 = a_2$

Consequently, the hypothesis is proven false for this case.

Case III. The two unequal single-tone input signals are given as:

$v_1(t) = v_1 \cos(2 W_{q-1} t/3 + a_1),$ and:

$v_2(t) = v_2 \cos(2 W_{q-1} t/3 + a_2).$

Referring to FIG. 14, the following equalities can be stated, assuming $s_1(w) = s_2(w)$:

$(\pi/2) A_o v_1 [e^{-ja1} + (k/2) v_1^2 e^{j2a1}] = (\pi/2) A_o v_2 [e^{-ja2} + (k/2) v_2^2 e^{j2a2}].$

Simplifying the above expression, there results:

$v_1 [e^{-ja1} + (k/2) v_1^2 e^{j2a1}] = v_2 [e^{-ja2} + (k/2) v_2^2 e^{j2a2}].$

Rearranging terms, there results:

$v_1 e^{-ja1} - v_2 e^{-ja2} = (k/2)(v_2^2 e^{j2a2} - v_1^2 e^{j2a1}),$ which has the solution:

$|v_1 e^{ja1} + v_2 e^{ja2}| = 2/k.$

This condition for ambiguity can be eliminated if the following restriction is imposed:

$v_n < 1/k.$

With this restriction the hypothesis is false.

Case IV: The two unequal single-tone input signals are given as:

$v_1(t) = v_1,$ and:

$v_2(t) = v_2.$

For this case, the phase term, $a_n$, has no meaning and is not used; therefore, referring to FIG. 14, the following equalities can be stated, assuming $s_1(w) = s_2(w)$:

$v_1 + k v_1^2 = v_2 + k v_2^2.$

Rearranging terms, there results.

$v_1 - v_2 = k(v_2^2 - v_1^2),$ which has the solution:

$$v_1+v_2=-1/k.$$

This condition for ambiguity can be eliminated if the following restriction is imposed:

$$v_n > -1/2k.$$

This restriction means that if the input signal contains a d.c. component that is always positive, then any value of $v_n$ will prove the hypothesis false; however, if the d.c. component is negative, then $v_n$ must be greater than $-1/2k$ to prove the hypothesis false.

It should be pointed out that the hypothesis was proven false for two unequal single-tone input signals without the necessity of utilizing the zero frequency output signal spectral term, namely:

$$\pi k v_n^2 d(w),$$

that exists for any input signal with a frequency value $w_n \neq 0$. This omission was intentional and particularly important since the general multitone input signal may contain a d.c. component that would also appear at zero frequency in the output signal's spectrum. The coalescence of these spectral terms at zero frequency would prevent the determination of what portion of the zero frequency term was due to the d.c component, if any. Since uniqueness can be proven without the use of the zero frequency term for single-tone input signals that are not at d.c., then the zero frequency contribution from these tones can be exactly determined; consequently that portion of the zero frequency spectrum resulting from the d.c. component of the input signal is distinguishable.

Since it has been proven that under prescribed restrictions on the single-tone input signal that:

$$V_q^{-1}[s_n(t)] = v_n(t);$$

therefore:

$$v_q^{-1}[V_q(t)] = v_{q-1}(t).$$

APPENDIX C
Practical filter considerations

Practical low-pass filters have transmission characteristics which only approach that of the ideal low-pass filter. Instead of the encoder stage output signal spectrum being multiplied by the function $p_a(w)$, where $a = w_{q-1}/2$, which is the ideal low-pass filter response (TABLE I(5)), it can now be considered multiplied by $F_q(w)$ which represents a function that adequately describes the frequency response of the practical low-pass filter. The output of an encoder stage, $N_q$, can, consequently, be expressed as:

$$V_q(t) = [V_{q-1}(t) + kV_{q-1}^2(t)][1 + m_1 A_{q-1}(t)] * F_q(t).$$

The expanded signal at the input to the corresponding decoder stage, $D_q$, is, therefore, expressed as:

$$E_q(t) = \{[V_{q-1}(t) + kV_{q-1}^2(t)][1 + m_1 A_{q-1}(t) * F_q(t)]\}[1 + m_2 C_q(t)].$$

If the frequency response of the low-pass filter utilized in the feedback circuit of the decoder stage, $D_q$, is defined by $G_q(w)$, then the controlling equation, since:

$$E_q[V_{q-1}(t)] = E_q[V(t)]$$

is written as:

$$\{[V_{q-1}(t) + kV_{q-1}^2(t)][1 + m_1 A_{q-1}(t)] * F_q(t)\}[1 + m_2 C_q(t)]$$
$$= \{[V(t) + kV^2(t)][1 + m_1 A_{q-1}(t) * G_q(t)]\}[1 + m_2 C_q(t)].$$

It is apparent that, if:

$$F_q(t) = G_q(t)$$

or:

$$F_q(w) = G_q(w)$$

then:

$$V_q[V_{q-1}(t)] = V_q[V(t)],$$

and:

$$V(t) = V_{q-1}(t).$$

Regardless of any deviations that the response of the practical low-pass filter has with respect to the ideal low-pass filter, if the filters in the corresponding encoder and decoder stages have identical frequency responses, then proper decoder stage operation will still occur.

It is important to point out that the uniqueness relationship between the input and output signal of an encoder or decoder stage was based upon the minimum theoretical bandwidth which, in practice, is unattainable. Practical encoder/decoder circuit designs will generally allow for a broader passband so as to minimize the signal attenuation within the passband because of the relatively broad falloff characteristics of the practical low-pass filter. The ideal filter has therefore provided the minimum signal information that would be necessary to establish uniqueness; consequently, using practical low-pass filters with wider passbands, more signal spectrum is available which will provide more information than is needed to insure uniqueness.

APPENDIX D
Explicitness of the Decoder Output Signal, $V_{q-1}(t)$ in the Decoder Input Expanded Signal, $E_q(t)$ The expanded signal at the input to the decoder stage, $D_q$, is expressed as:

$$E_q(t) = \{[V_{q-1}(t) + kV_{q-1}^2(t)][1 + m_1 A_{q-1}(t)] * (1/\pi t) \sin(W_{q-1} t/2)\}[1 + m_2 C_{q-1}(t)],$$

where:

$$C_{q-1}(t) = C \cos(W_{q-1} t),$$

and:

$$A_{q-1}(t) = A \sum_{r=-\infty}^{\infty} J_0(p_2 B/W_b) \cos(W_{q-1} t + rW_b t).$$

Only $V_{q-1}(t)$ is of interest and the effect on it by the carriers; therefore, $V^2_{q-1}(t)$ and the $r \neq 0$ terms will be neglected, resulting in the following:

$$\{V_{q-1}(t)[1 + m_1 A J_0(p_2 B/W_b) \cos(W_{q-1} t)] * (1/\pi t) \sin(W_{q-1} t/2)\}[1 + m_2 C \cos(W_{q-1} t)]$$

The remainder of the analysis is more easily demonstrated in the frequency domain; therefore, the above expression is written as:

which is rewritten as:

$$V_{q-1}(w)[pw_{q-\frac{1}{2}}(w)+pw_{q-\frac{1}{2}}(w+W_{q-1})+pw_{q-\frac{1}{2}}(w-W_{q-1})].$$

$$\left[V_{q-1}(w) * \left\{2\pi d(w) + \pi m_1 AJ_o\left(\frac{p_2 B}{W_b}\right)[\pi d(w + W_{q-1}) + \pi d(w - W_{q-1})]\right\} \cdot p_{\frac{W_{q-1}}{2}}(w)\right] * \{2\pi d(w) +$$

$$\pi m_2 C[\pi d(w + W_{q-1}) + \pi d(w - W_{q-1})]\} =$$

$$\left[V_{q-1}(w) + \frac{m_1}{2} AJ_o\left(\frac{p_2 B}{W_b}\right) V_{q-1}(w + W_{q-1}) + \frac{m_1}{2} AJ_o\left(\frac{p_2 B}{W_b}\right) V_{q-1}(w - W_{q-1})\right] \cdot$$

$$p_{\frac{W_{q-1}}{2}}(w) * \{2\pi d(w) + \pi m_2 C[\pi d(w + W_{q-1}) + \pi d(w - W_{q-1})]\} = V_{q-1}(w) \cdot p_{\frac{W_{q-1}}{2}}(w) + \frac{m_1}{2} AJ_o\left(\frac{p_2 B}{W_b}\right) V_{q-1}(w +$$

$$W_{q-1}) \cdot p_{\frac{W_{q-1}}{2}}(w) + \frac{m_1}{2} AJ_o\left(\frac{p_2 B}{W_b}\right) V_{q-1}(w - W_{q-1}) \cdot p_{\frac{W_{q-1}}{2}}(w) + \frac{m_2}{2} CV_{q-1}(w +$$

$$W_{q-1}) \cdot p_{\frac{W_{q-1}}{2}}(w) + \frac{m_1 m_2}{4} ACJ_o\left(\frac{p_2 B}{W_b}\right) V_{q-1}(w + 2W_{q-1}) \cdot p_{\frac{W_{q-1}}{2}}(w + W_{q-1}) +$$

$$\frac{m_1 m_2}{4} ACJ_o\left(\frac{p_2 B}{W_b}\right) V_{q-1}(w) \cdot p_{\frac{W_{q-1}}{2}}(w + W_{q-1}) + \frac{m_2}{2} CV_{q-1}(w - W_{q-1}) \cdot p_{\frac{W_{q-1}}{2}}(w - W_{q-1}) +$$

$$\frac{m_1 m_2}{4} ACJ_o\left(\frac{p_2 B}{W_b}\right) V_{q-1}(w) \cdot p_{\frac{W_{q-1}}{2}}(w - W_{q-1}) + \frac{m_1 m_2}{4} ACJ_o\left(\frac{p_2 B}{W_b}\right) V_{q-1}(w - 2W_{q-1}) \cdot p_{\frac{W_{q-1}}{2}}(w - W_{q-1}).$$

If:

$$m_1 m_2 ACJ_o(p_2 B/W_b) = 4,$$

then, combining only the $V_{q-1}(w)$ terms, there results:

$$V_{q-1}(w)pw_{q-\frac{1}{2}}(w)+V_{q-1}(w)pw_{q-\frac{1}{2}}(w+W_{q-1})+V_{q-1}(w)pw_{q-\frac{1}{2}}(w-W_{q-1}),$$

The terms in the bracket are equal to:

$$pw_q(w),$$

and there results:

$$V_{q-1}(w)pw_q(w) = V_{q-1}(w),$$

which is the expression for the output signal of the decoder stage $D_q$.

TABLE I

ALL MATHEMATICAL NOTATIONS USED IN THIS TABLE WERE OBTAINED FROM: "THE FOURIER INTEGRAL AND ITS APPLICATIONS," ATHANASIOS POPOULUS, MCGRAW-HILL BOOK COMPANY, 1962.

(1) $F[f(t)] = F(w),$ $$F(w) = \int_{-\infty}^{\infty} f(t)e^{-jwt}dt; \quad w = 2\pi f.$$

(2) $F^{-1}[F(w)] = f(t),$ $$f(t) = \frac{1}{2\pi} \int_{-\infty}^{\infty} F(w)e^{jwt}dw.$$

(3) $$F[v_n \cos(w_n t + a_n)] = \pi v_n e^{j\frac{a_n}{w_n}(w)}[d(w + w_n) + d(w - w_n)]$$

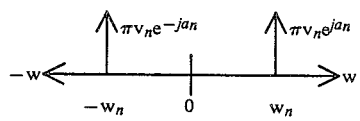

TABLE I-continued

ALL MATHEMATICAL NOTATIONS USED IN THIS TABLE WERE OBTAINED FROM:
"THE FOURIER INTEGRAL AND ITS APPLICATIONS," ATHANASIOS POPOULUS,
MCGRAW-HILL BOOK COMPANY, 1962.

(4) $$F\left[\int_{-\infty}^{\infty} f_1(\tau)f_2(t-\tau)d\tau\right] = F[f_1(t)*f_2(t)] = F_1(w)F_2(w)$$

(5) $$F\left[\frac{1}{\pi t}\sin(at)\right] = P_a(w)$$

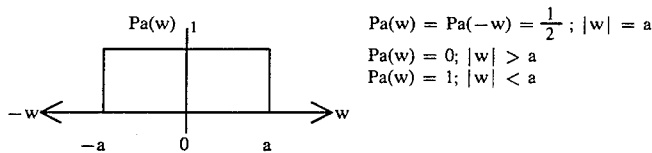

$P_a(w) = P_a(-w) = \frac{1}{2}; \ |w| = a$
$P_a(w) = 0; \ |w| > a$
$P_a(w) = 1; \ |w| < a$ (6) $$s_n(t) = \left\{ v_n\cos(w_n t + a_n) - \frac{k}{2}v_n^2 + \frac{k}{2}v_n^2\cos(2w + 2a_n) + \right.$$

$$\frac{v_n}{2}\sum_{r=-\infty}^{\infty} A_r \cos[(w_n + W_{q-1} + rW_b)t + a_n] +$$

$$\frac{v_n}{2}\sum_{r=-\infty}^{\infty} A_r \cos[(w_n - W_{q-1} - rW_b)t + a_n] +$$

$$\frac{kv_n^2}{2}\sum_{r=-\infty}^{\infty} A_r \cos(W_{q-1} + rW_b)t +$$

$$\frac{kv_n^2}{4}\sum_{r=-\infty}^{\infty} A_r \cos[(2w_n + W_{q-1} + rW_b)t + 2a_n] +$$

$$\left. \frac{kv_n^2}{4}\sum_{r=-\infty}^{\infty} A_r \cos[(2w_n - W_{q-1} - rW_b)t + 2a_n] \right\} * \frac{1}{\pi t}\sin\left(\frac{W_{q-1}t}{2}\right).$$

(7) $$s_n(w) = \pi\left\{ v_n e^{j\frac{a_n}{w_n}(w)}[d(w + w_n) + d(w - w_n)] + \right.$$

$$kv_n^2 d(w) + \frac{k}{2}v_n^2 e^{j\frac{a_n}{w_n}(w)}[d(w + 2w_n) + d(w - 2w_n)] +$$

$$\frac{v_n}{2}\sum_{r=-\infty}^{\infty} A_r e^{j\frac{a_n}{w_n + W_{q-1} + rW_b}(w)}[d(w + w_n + W_{q-1} + rW_b) + d(w - w_n - W_{q-1} - rW_b)] +$$

$$\frac{v_n}{2}\sum_{r=-\infty}^{\infty} A_r e^{j\frac{a_n}{w_n - W_{q-1} - rW_b}(w)}[d(w + w_n - W_{q-1} - rW_b) + d(w - w_n + W_{q-1} + rW_b)] +$$

$$kv_n^2 \sum_{r=-\infty}^{\infty} A_r[d(w + W_{q-1} + rW_b) + d(w - W_{q-1} - rW_b)] +$$

$$\frac{kv_n^2}{4}\sum_{r=-\infty}^{\infty} A_r e^{j\frac{2a_n}{2w_n + W_{q-1} + rW_b}}[d(w + 2w_n + W_{q-1} + rW_b) + d(w - 2w_n - W_{q-1} - rW_b)] +$$

$$\left. \frac{kv_n^2}{4}\sum_{r=-\infty}^{\infty} A_r e^{j\frac{2a_n}{2w_n - W_{q-1} - rW_b}}[d(w + 2w_n - W_{q-1} - rW_b) + d(w - 2w_n + W_{q-1} + rW_b)] \right\} \cdot$$

$$p_{\frac{W_{q-1}}{2}}(w).$$

TABLE I-continued

ALL MATHEMATICAL NOTATIONS USED IN THIS TABLE WERE OBTAINED FROM:
"THE FOURIER INTEGRAL AND ITS APPLICATIONS," ATHANASIOS POPOULUS,
MCGRAW-HILL BOOK COMPANY, 1962.

(8)
$$s_n(w) = \pi \Bigg\{ v_n e^{j\frac{a_n}{w_n}(w)}[d(w+w_n)+d(w-w_n)] +$$

$$kv_n^2 d(w) + \frac{k}{2} v_n^2 e^{j\frac{a_n}{w_n}(w)}[d(w+2w_n)+d(w-2w_n)] +$$

$$\frac{v_n}{2} \sum_{r=-\infty}^{\infty} A_r e^{j\frac{a_n}{w_n - W_{q-1} - rW_b}(w)}[d(w+w_n-W_{q-1}-rW_b)+d(w-w_n+W_{q-1}+rW_b)] +$$

$$\frac{kv_n^2}{4} \sum_{r=-\infty}^{\infty} A_r e^{j\frac{2a_n}{2w_n - W_{q-1} - rW_b}(w)}[d(w+2w_n-W_{q-1}-rW_b)+d(w-2w_n+W_{q-1}+rW_b)] \Bigg\} \cdot$$

$$p_{\frac{W_{q-1}}{2}}(w).$$

(9)
$$s_n(w) = \pi \Bigg\{ v_n e^{ja_n} d(w+w_n) + kv_n^2 d(w) + \frac{k}{2} v_n^2 e^{-j2a_n} d(w-2w_n) +$$

$$\frac{v_n}{2} \sum_{r=-\infty}^{\infty} A_r e^{-ja_n} d(w+w_n-W_{q-1}-rW_b) +$$

$$\frac{kv_n^2}{4} \sum_{r=-\infty}^{\infty} A_r e^{-j2a_n} d(w+2w_n-W_{q-1}-rW_b) +$$

$$\frac{kv_n^2}{4} \sum_{r=-\infty}^{\infty} A_r e^{j2a_n} d(w-2w_n+W_{q-1}+rW_b) \Bigg\} \cdot p_{\frac{W_{q-1}}{2}}(w).$$

What I claim is:

1. A method of reducing the bandwidth of an intelligence-bearing signal comprising the steps of:
    (a) earmarking said signal by adding thereto a nonlinear signal obtained from said intelligence-bearing signal;
    (b) multiplying the earmarked signal resulting from step (a) above with an angle-modulated carrier having a radian carrier frequency numerically equal to the nominal bandwidth of said intelligence-bearing signal thereby to effectively reverse the signal spectrum of said intelligence-bearing signal over a predetermined frequency range;
    (c) summing the multiplied signal resulting from step (b) above with the earmarked signal resulting from step (a) above; and then
    (d) filtering the summed signal resulting from step (c) above in a low-pass filter.

2. The method according to claim 1 wherein said multiplying step comprises multiplying said earmarked signal with a phase-modulated carrier.

3. The method according to claim 1 wherein said multiplying step comprises multiplying said earmarked signal with a frequency-modulated carrier.

4. The method according to claim 1 wherein said earmarking step comprises earmarking said signal by adding thereto a nonlinear signal obtained by passing said intelligence-bearing signal through a two-quadrant square-law device.

5. The method according to claim 1 wherein said earmarking step comprises earmarking said signal by adding thereto a non-linear signal obtained by passing said intelligence-bearing signal through a piecewise-linear device.

6. The method according to claim 1 wherein to still further reduce the bandwidth of said intelligence-bearing signal, the method comprises the further step of:
    (e) reiterating method steps (a)–(d) above an additional $(Q-1)$ times, $Q \geq 2$.

7. The method according to claim 1 wherein method steps (a) through (d) are effected in a single encoder stage, Q of said stages are cascaded, and for the $q^{th}$ one of said Q stages said intelligence-bearing signal $V_{q-1}(t)$ has a bandwidth $W_{q-1}$, said angle-modulated carrier $A_{q-1}(t)$ is of the form $A \cos[W_{q-1}t + P(t)]$, said multiplied signal has the form $[V_{q-1}(t)+kV_{q-1}^2(t)]m_1 A_{q-1}(t)$ where k and $m_1$ are arbitrary constants, the signal spectrum of said intelligence-bearing signal being effectively reversed over the frequency range $w \leq W_{q-1}$, and said low-pass filter has a cut-off frequency within the range $W_{q-1}/2 \leq w \leq W_{q-1}$.

8. The method according to claim 7 wherein said angle modulation is frequency modulation and $$P(t) = p_2 \int B(t) dt$$

where $B(t) = B \cos(W_b t)$
and $p_2 =$ frequency modulation constant.

9. The method according to claim 7 wherein said angle modulation is phase modulation and $P(t) = p_1 B(t)$ where $B(t) = B \cos(W_b t)$
and $p_1$ = phase modulation constant.

10. A method of expanding the bandwidth of an intelligence-bearing signal that has priorly been reduced in bandwith, thereby to restore said signal to its original condition, which comprises the steps of:
  (e) multiplying the reduced bandwidth signal by a carrier signal of constant amplitude and radian frequency numerically equal to the nominal bandwidth of the signal to be reconstructed;
  (f) combining the multiplied signal obtained in step (e) above with said reduced bandwidth signal to obtain an expanded bandwidth signal; and
  (g) taking the difference between said expanded bandwidth signal and a second signal itself the difference between the signal resulting from this step (g) and a third signal also a function of the signal resulting from step (g).

11. The method according to claim 10 wherein said third signal is obtained by the steps of:
  (h) reducing the bandwidth of the signal obtained in step (g) above in a manner and to a degree substantially identical to that priorly used to reduce the bandwidth of said intelligence-bearing signal;
  (i) multiplying the reduced bandwidth signal obtained in step (h) above by a carrier signal of constant amplitude and radian frequency numerically equal to the bandwidth of the signal to be reconstructed; and
  (j) combining the multiplied signal obtained in step (i) with the reduced bandwidth signal obtained in step (h) above.

12. The method according to claim 10 wherein said priorly reduced bandwidth signal was obtained by a series of Q bandwidth reductions, in Q encoder stages, comprising the further step of:
  (k) reiterating method steps (e) through (g) above, an additional $(Q-1)$ times, $Q \geq 2$, thereby to obtain the original information-bearing signal.

13. Apparatus for reducing the bandwidth of an intelligence-bearing signal, which comprises:
  (a) means for generating a nonlinear signal from said intelligence-bearing signal;
  (b) means for adding said nonlinear signal to said intelligence-bearing signal thereby to earmark the same;
  (c) a source of an angle-modulated carrier signal having a radian carrier frequency numerically equal to the nominal bandwidth of said intelligence-bearing signal;
  (d) means for multiplying said earmarked signal with said angle-modulated carrier signal thereby to effectively reverse the signal spectrum of said intelligence-bearing signal over a predetermined frequency range;
  (e) means for summing said earmarked signal and said multiplied signal; and
  (f) low-pass filter means for filtering the output of said summing means.

14. The apparatus according to claim 13 wherein said nonlinear signal generating means comprises a two-quadrant, square-law device.

15. The apparatus according to claim 13 wherein said nonlinear signal generating means comprises a piecewise-linear device.

16. The apparatus according to claim 13 wherein said angle-modulated carrier signal is a frequency modulated carrier signal.

17. The apparatus according to claim 13 wherein said angle-modulated carrier signal is a phase-modulated carrier signal.

18. The apparatus according to claim 13 wherein elements (a)–(f) define a signal encoder stage, said apparatus further comprising $(Q-1)$ additional encoder stages thereby defining a Q-stage bandwidth reduction system, the source of the radian carrier frequency signal associated with each successive stage generating a plurality of carrier frequency signals of successively diminishing frequency.

19. The apparatus according to claim 18 wherein said radian carrier frequency sources comprise:
  a master oscillator; and
  Q frequency-dividers connected to said master oscillator, each having a different division ratio, for generating the carrier frequency signals for each of said Q encoders, said apparatus further comprising:
  an additional frequency divider, connected to said master oscillator, for generating a synchronizing signal for transmission with said reduced bandwidth signal.

20. The apparatus according to claim 18 wherein the cut-off frequency of the low-pass filter means associated with each successive encoder stage decreases successively.

21. Apparatus for expanding the bandwidth of an intelligence-bearing signal that has priorly been reduced in bandwidth, thereby to restore said signal to its original condition, which comprises:
  (a) a source of a constant amplitude carrier signal having a radian frequency numerically equal to the nominal bandwidth of the signal to be reconstructed;
  (b) means for multiplying said reduced bandwidth signal with said carrier signal;
  (c) means for combining said multiplied signal with said reduced bandwidth signal thereby to obtain an expanded bandwidth signal; and
  (d) means for taking the difference between said expanded bandwidth signal and a second signal itself the difference between the output of said difference taking means and a third signal also derived from the output of said difference taking means.

22. The apparatus according to claim 21 wherein said difference taking means comprises:
  (e) a first differencing circuit having an output, and first and second inputs, said expanded bandwidth signal being connected to said first input;
  (f) a second differencing circuit having an output and first and second inputs, said output being connected to the second input of said first differencing circuit, said first input being connected to the output of said differencing circuit;
  (g) a bandwidth-reducing encoder having an input connected to the output of said first differencing circuit, said encoder being substantially identical to the corresponding encoder priorly used to reduce the bandwidth of said intelligence-bearing signal;
  (h) a source of a carrier signal of constant amplitude and radian frequency numerically equal to the nominal bandwidth of the signal to be reconstructed;
  (i) means for multiplying the output of said encoder with said carrier signal; and (j) means for summing said multiplied signal and the output of said encoder, said summed signal comprising the second input to said second differencing circuit.

23. The apparatus according to claim 22 wherein the prior bandwidth reduction of said integelligence-bearing signal is effected in Q encoder stages, elements (a) through (j) define a single decoder stage, and said apparatus further comprises:

(Q−1) additional decoder stages, thereby defining a Q-stage bandwidth expansion system, the sources of the constant amplitude carrier frequency signal associated with each successive stage generating a common frequency of successively increasing frequency.

24. The apparatus according to claim 23 wherein each of said bandwidth-reducing encoders is substantially identical to the corresponding one of the Q encoders used to priorly reduce the bandwidth of said intelligence-bearing signal.

25. The apparatus according to claim 23 wherein a synchronizing signal accompanies said reduced bandwidth signal and said apparatus further comprises:

a first phase-lock loop circuit, connected to said synchronizing signal, for multiplying the frequency of said synchronizing signal;

a second phase-lock loop circuit, connected to said first phase-lock loop circuit, for stabilizing the phase of said multiplied synchronizing signal;

Q first frequency-dividers connected to said second phase-lock loop circuit for generating said carrier frequency signals of constant amplitude; and Q second frequency-dividers connected to said second phase-lock loop for generating the angle-modulated carrier signals required by each of said encoder stages.

26. A transmission system for transmitting an intelligence-bearing signal of bandwidth W over a transmission facility of bandwidth w, w<W, which comprises:

Q cascaded, bandwidth-reducing encoder stages each successive stage including means for earmarking the signal input thereto and means for folding and filtering said earmarked signal to reduce the bandwidth thereof, the output of the $Q^{th}$ stage being input to said transmission facility; and Q cascaded, bandwidth-increasing decoder stages connected to the output of said transmission facility each successive stage including means for unambiguously unfolding the folded signal input thereto to expand the bandwidth thereof, each stage including a bandwidth-reducing encoder substantially identical to the corresponding one of the Q encoder stages at the remote end of said transmission facility.

27. The system according to claim 26 further comprising:

means, associated with said Q bandwidth-reducing encoder stages, for transmitting a synchronizing signal over said transmission facility; and means, associated with said Q bandwidth-reducing decoder stages, for detecting said synchronizing signal.

28. A method of reducing the bandwidth of an intelligence-bearing signal by a factor of Q, $Q \geqq 2$, steps (a) through (c) of said method being effected in a single encoder stage, Q of said stages being cascaded, and for the qth one of said stages, said method comprises the steps of:

(a) earmarking said signal by adding thereto a nonlinear signal obtained from said intelligence-bearing signal;

(b) multiplying the earmarked signal from step (a) above with an angle-modulated carrier having a radian carrier frequency which is numerically equal to the nominal bandwidth of said intelligence-bearing signal to effectively reverse the signal spectrum of said intelligence-bearing signal over a predetermined frequency range;

(c) summing the multiplied signal resulting from step (b) above with the earmarked signal resulting from step (a) above;

(d) reiterating method steps (a) through (c) above an additional (Q−1) times, $Q \geqq 2$; and then (e) filtering the summed signal resulting from step (d) above, from the Qth stage, in a low-pass filter.

29. A method of expanding the bandwidth of an intelligence-bearing signal that has priorly been reduced in bandwidth by the method according to claim 28, thereby to restore said signal to its original condition, wherein steps (f) through (h) are effected in a signal expanding circuit, Q of said circuits are cascaded, and for the qth one of said circuits, the method comprises the steps of:

(f) multiplying the reduced bandwidth signal by a carrier signal of constant amplitude and a radian frequency which is numerically equal to the nominal bandwidth of the signal to be reconstructed;

(g) combining the multiplied signal obtained in step (f) above with said reduced bandwidth signal to obtain an expanded bandwidth signal;

(h) and reiterating steps (f) and (g) above an additional (Q−1) times, $Q \geqq 2$; and then (i) taking the difference between said expanded bandwidth signal from step (h) above, itself the difference between the signal resulting from this step (i), and a third signal also a function of the signal resulting from step (i).

30. The method according to claim 29, wherein said third signal is obtained by the steps of:

(j) reducing the bandwidth of the signal obtained in step (i) above in a manner and to a degree substantially identical to that priorly used to reduce the bandwidth of said intelligence-bearing signal in steps (a) through (e) above; and then:

(k) expanding the reduced bandwidth signal obtained from step (j) above in a manner and to a degree substantially identical to that priorly used in steps (f) through (h) above.

* * * * *